(12) United States Patent
Nishioki et al.

(10) Patent No.: US 6,360,176 B1
(45) Date of Patent: Mar. 19, 2002

(54) TOUCH SIGNAL PROBE

(75) Inventors: Nobuhisa Nishioki; Nobuhiro Ishikawa, both of Tsukuba (JP)

(73) Assignee: Mitutoyo Corporation, Kanagawa-Ken (JP)

( * ) Notice: Subject to any disclaimer, the term of this patent is extended or adjusted under 35 U.S.C. 154(b) by 0 days.

(21) Appl. No.: 09/290,610

(22) Filed: Apr. 13, 1999

(30) Foreign Application Priority Data

Apr. 14, 1998 (JP) .......................................... 10-102832
Jul. 29, 1998 (JP) .......................................... 10-214010

(51) Int. Cl.$^7$ ............................................. G01H 13/00
(52) U.S. Cl. ........................ 702/56; 702/33; 702/113; 702/150; 702/183
(58) Field of Search ................. 702/33–36, 39, 702/54, 56, 113, 115, 150–153, 167, 168, 183, 184; 700/160, 195, 275, 280; 33/503, 504, 556, 558, 559, 561; 73/651, 649, 658, 634, 662, 579

(56) References Cited

U.S. PATENT DOCUMENTS

| | | | | |
|---|---|---|---|---|
| 4,397,188 A | * | 8/1983 | Bansevichus et al. | 73/651 |
| 4,629,957 A | * | 12/1986 | Walters et al. | 318/662 |
| 4,679,326 A | * | 7/1987 | Takizawa et al. | 33/170 |
| 4,744,153 A | * | 5/1988 | Brand | 33/517 |
| 5,018,280 A | * | 5/1991 | Enderle et al. | 33/832 |
| 5,111,592 A | * | 5/1992 | Aehnelt et al. | 33/561 |
| 5,118,956 A | * | 6/1992 | Dunning et al. | 250/561 |
| 5,222,034 A | * | 6/1993 | Shelton et al. | 364/559 |
| 5,247,751 A | * | 9/1993 | Ohya et al. | 33/561 |
| 5,497,559 A | * | 3/1996 | Okumnura et al. | 33/517 |
| 5,524,354 A | * | 6/1996 | Bartzke et al. | 33/561 |
| 5,625,957 A | * | 5/1997 | Breyer et al. | 33/503 |
| 5,712,961 A | * | 1/1998 | Matsuo | 395/93 |
| 5,734,373 A | * | 3/1998 | Rosenberg et al. | 345/161 |
| 5,756,886 A | * | 5/1998 | Nishimura et al. | 73/105 |
| 5,884,410 A | * | 3/1999 | Prinz | 33/559 |
| 5,922,964 A | * | 7/1999 | Ishikawa et al. | 73/661 |
| 6,044,569 A | * | 4/2000 | Ogihara et al. | 33/503 |
| 6,163,973 A | * | 12/2000 | Matsumiya et al. | 33/559 |
| 6,198,298 B1 | * | 3/2001 | Nishioki | 324/754 |

FOREIGN PATENT DOCUMENTS

| | | |
|---|---|---|
| GB | 2070249 | 9/1981 |
| JP | 070332914 | 12/1995 |
| JP | 09210613 | * 8/1997 |
| JP | 10047941 | * 2/1998 |
| JP | 10-176902 | 6/1998 |
| JP | 10176902 | * 6/1998 |
| JP | 10176917 | * 6/1998 |
| WO | WO95/08093 | 3/1995 |

OTHER PUBLICATIONS (1) English Language Abstract of JP 10–176902.

* cited by examiner

Primary Examiner—Marc S. Hoff
Assistant Examiner—Carol S Tsai
(74) Attorney, Agent, or Firm—Lowe Hauptman Gilman & Berner, LLP

(57) ABSTRACT

A vibration change is detected by a touch signal probe having a vibrator (16) composed of a stylus support (10) and a stylus (13) attached thereto, and a vibrating/detecting means (12) provided to the stylus support (10) for applying vibration to the vibrator (16) and detecting a vibration condition changing when the stylus (13) touches a workpiece. The vibrator (16) is vibrated at a frequency equivalent to secondary intrinsic frequency (w2) to make resonance and the vibration change is detected by superposing a vibration component of primary intrinsic frequency (w1). Though the vibration at the secondary intrinsic frequency (w2) has high Q value, response amplitude is small. Accordingly, the vibration change is amplified by superposing the vibration component of the primary intrinsic frequency (w1).

19 Claims, 19 Drawing Sheets

F I G. 1
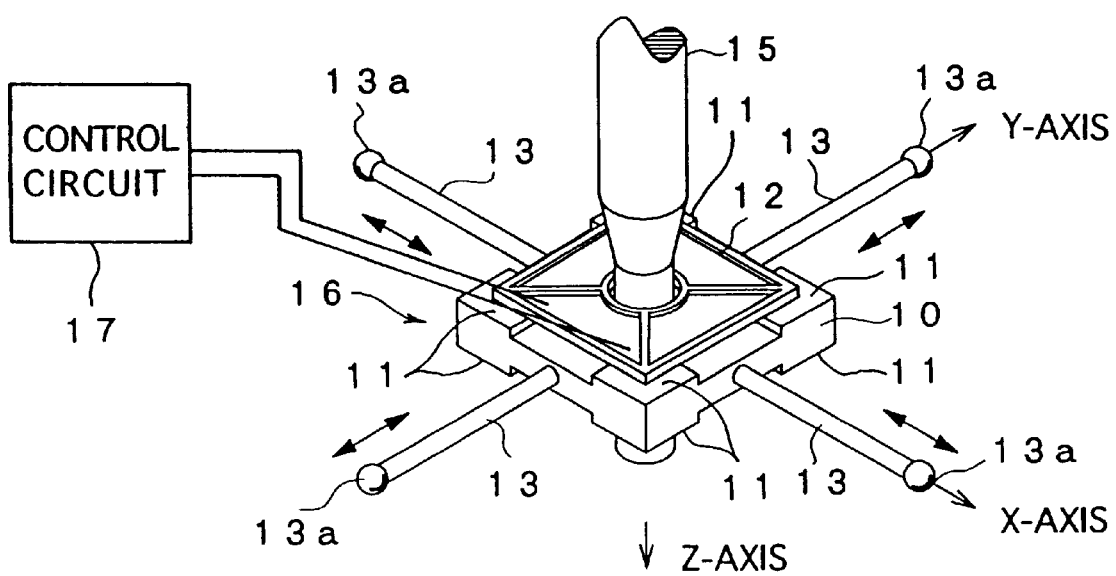

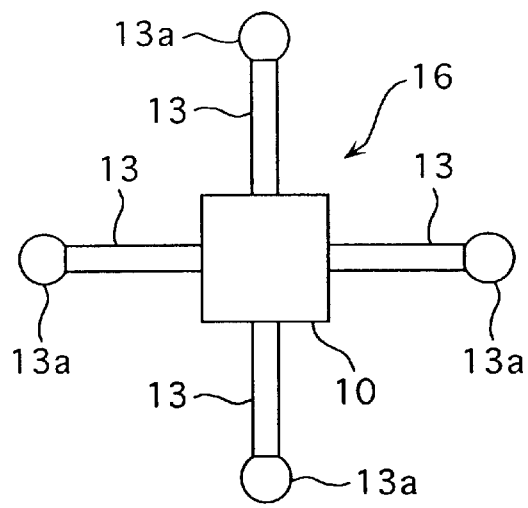
F I G. 2(A)
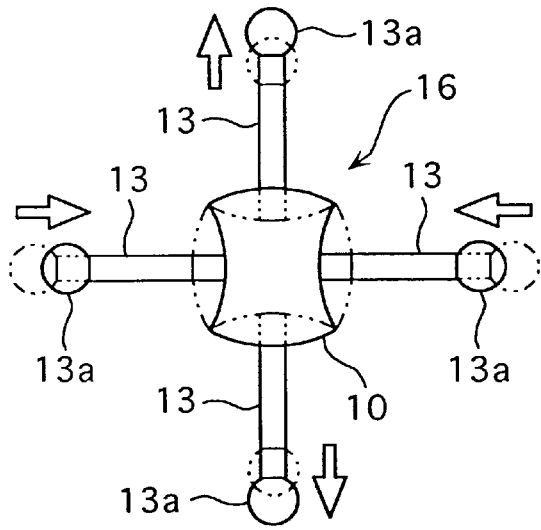
F I G. 2(B)
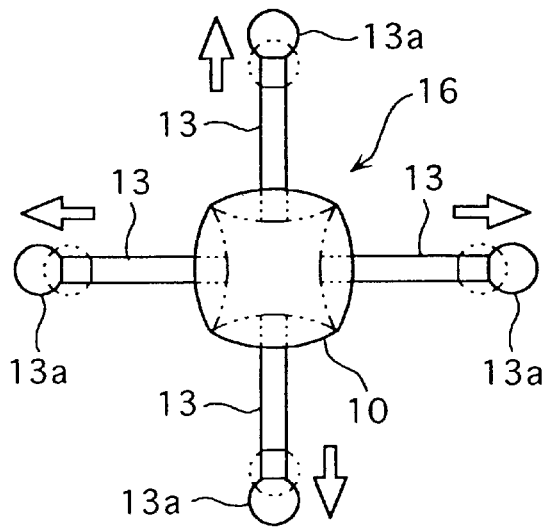
F I G. 2(C)

F I G. 3(A)
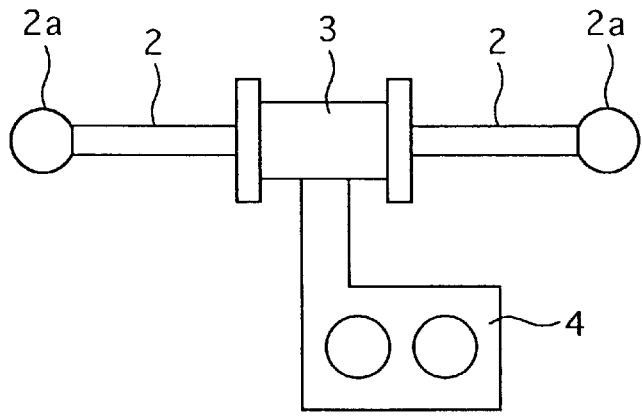
F I G. 3(B)
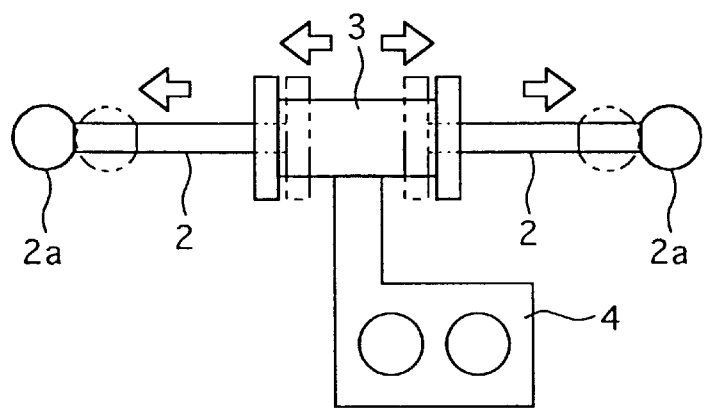
F I G. 3(C)
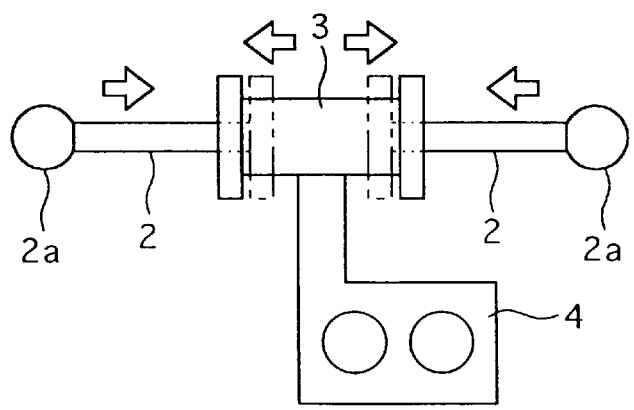

F I G. 4(A)
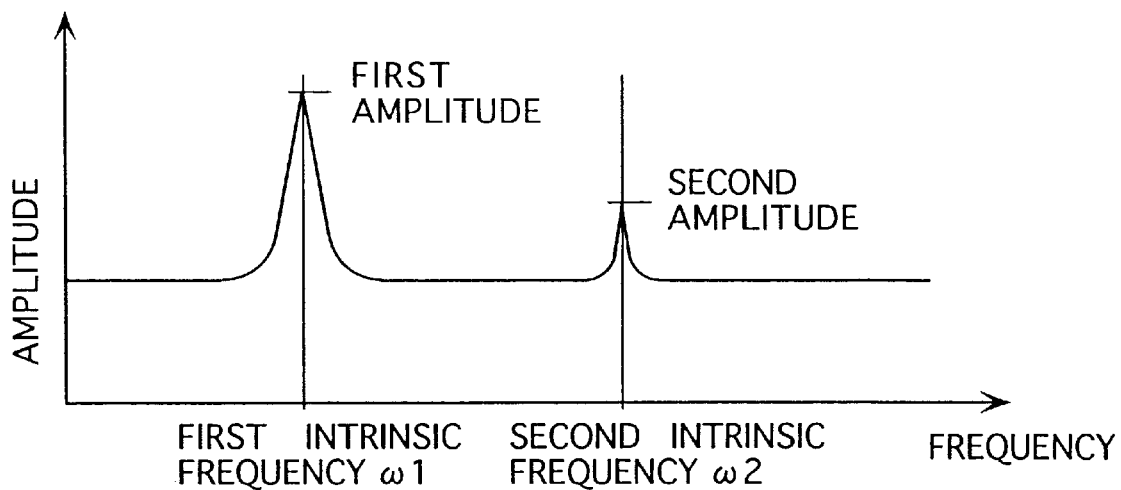
F I G. 4(B)
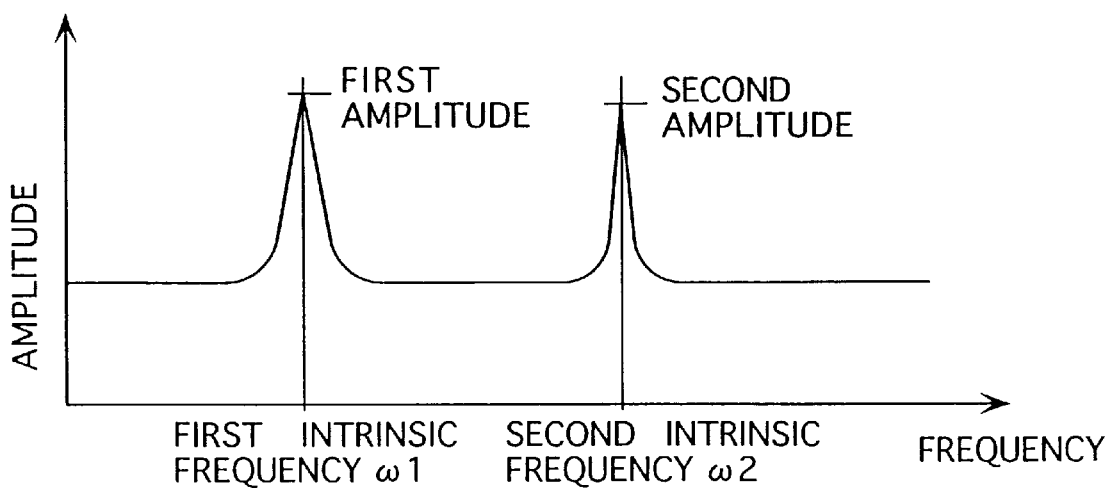

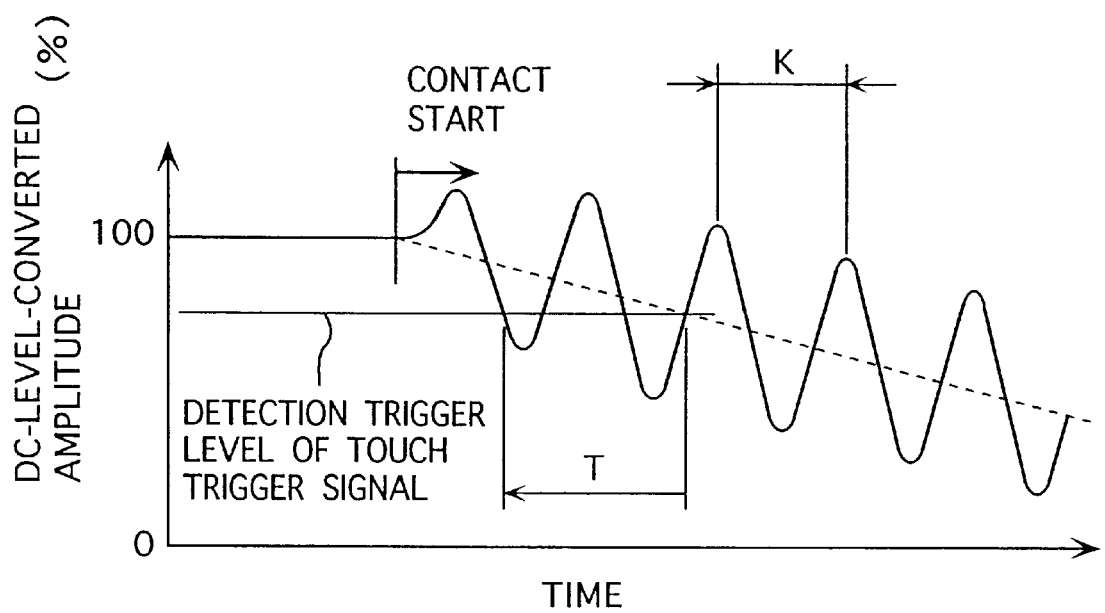
F I G. 6

(SMALL Q VALUE)

(LARGE Q VALUE)

TOUCH SIGNAL PROBE

BACKGROUND OF THE INVENTION

1. FIELD OF THE INVENTION

The present invention relates to a touch signal probe suitable for being a coordinate-measuring machine or a machine tool for measuring configuration of a workpiece. More specifically, it relates to a highly sensitive vibrating touch signal probe requiring low measurement power.

2. DESCRIPTION OF RELATED ART

A height gauge (linear measuring machine), a coordinate measuring machine and a contour measuring machine are known as a measuring machine for measuring configuration and dimension of a workpiece. For measuring coordinate and position, a touch signal probe is used to the measuring machine for detecting contact of the workpiece.

One detection mechanism uses a substantially cylindrical stylus having a contact portion to be abutted to the workpiece at the pointed end thereof, and a vibrating/detecting means for vibrating the stylus and detecting change of the vibration accompanied by the contact of the contact portion to the workpiece. In this arrangement, a touch trigger signal is transmitted when the vibration is damped to a detection trigger level and a coordinate value thereat is read.

In the vibrating touch signal probe, a radial arrangement (forming a plurality of stylus to a probe in a ramifying manner) is desirable for broadening the applicable range, and arranging the stylus crosswise is effective, for example.

One example of the probe having crosswise-arranged stylus is shown in FIG. 12. In the Figure, the vibrating touch signal probe has a pair of stylus support 3 fixed to a pointed end of the probe body 5 as a probe axis. The pair of the stylus support 3 is joined to orient in X and Y axis direction respectively, and a stylus 2 is protruded on both sides thereof. An upper portion of respective stylus support 3 has a piezoelectric element 4 as a vibrating/detecting means provided along the respective styluses 2. Each of the stylus 2 is vibrated by the piezoelectric element 4 and the contact ball 2a on the pointed end thereof is abutted to a workpiece, thereby detecting a change in restraining condition of the vibration (conventional art 1).

According to the conventional art 1, since two pairs of linear stylus support 3 are combined and the stylus is not disposed coplanarly, it is inconvenient in practical use and size reduction thereof is difficult.

On the other hand, a touch signal probe having a block-shaped stylus support, a piezoelectric element as vibrating/detecting means disposed to locating projection projectingly provided to four corners of respective upper and lower surfaces of the stylus support, and a symmetric first and second stylus respectively oriented in X and Y axis direction at a center of each side of the stylus support, thereby arranging radially, has been developed (Japanese Patent Laid-Open No. Hei 10-176902: conventional art 2).

According to the conventional art 2, since the symmetric first and second styluses oriented respectively in X and Y axis are disposed at the center of respective sides of the stylus support, there is no inconvenience as in the conventional art 1. However, since a reciprocating vibration is caused to both of the X and Y axis by a single piezoelectric element, a total of four vibration system is combined, resulting in difficulty in raising Q value of a resonant vibration as compared to the conventional art 1.

FIGS. 13(A) and 13(B) are graphs showing a relationship between a frequency and amplitude in the aforesaid conventional art 1 and 2. FIG. 13(A) shows small Q value case and FIG. 13(B) shows large Q value case. Amplitude difference D (amplitude change by contact) between amplitude at a resonant point in a non-contact state and amplitude at the resonant point after contact is larger when the Q value is large than when the Q value is small. Accordingly, it can be observed that the Q value of the vibration at the resonant state is a significant factor which directly controls sensitivity of a vibrating touch signal probe, in which the change in resonance by contact is used as detection principle of detection.

As described above, the touch signal probe having radial arrangement as in the conventional art 2 is inferior in sensitivity to the conventional art 1 having the same stylus length, and the detection response time can be widely varied.

Furthermore, when the stylus contacts at a high speed (more than 10mm/sec, at present), the touch signal prove is vibrated by an impact in contact, resulting in unpredictable disorder of detected amplitude change.

When the stylus touches the workpiece at a high-speed, detected vibration displacement is regularly decreased from initiation of contact as shown in FIG. 14(A). On the other hand, newly generated vibration waveform can be detected by the impact as shown in FIG. 14(B). These signals are combined to be the detection signal of the stylus.

FIG. 14(C) is a graph showing relationship between amplitude and time, the amplitude representing the signal detected by the stylus and converted to DC level. In FIG. 14(C), the time before reaching detection level of the touch trigger signal differs between a case in which the vibration by the impact is applied in equal phase (shown in solid line) and a case in which the vibration by the impact is applied in inverse phase (shown in dotted line). The time difference becomes dispersion error C of detection response time, which causes detection error.

Accordingly, the dispersion of the detection response time increases in accordance with the increase of the contact speed. Incidentally, the phenomenon inevitably occurs in common to all of the conventional vibrating touch signal probes. Since the frequency of the vibration caused by the contact is intrinsic frequency of the vibrator composed of the stylus and the stylus support, it is difficult to separate the signal component on account of the principle in which the resonant frequency is used for vibration and detection.

A touch signal probe of a modification of the conventional art 2 is shown in FIG. 15. A probe support 50 supports a block-shaped stylus support 51. Locating projections 52 are projectingly disposed on four corners of upper and lower side of the stylus support 51. Piezoelectric elements 53 as vibrating means and detecting means are disposed on the respective locating projections 52 and symmetric first and second styluses 54 respectively oriented in X and Y-axis directions are disposed to a center of respective sides of the stylus support. Since the entire body including the stylus support 51 and the plurality of the styluses 54 is a vibrator forming one vibration system, the above-structured touch signal probe can be simply and easily assembled and stable resonance characteristic can be obtained.

The piezoelectric element 53 uses conventional linear wiring pattern for ultrasonic touch sensor. Specifically, a part of one piezoelectric element 3 is used as a vibrating electrode 53A and the other part of the piezoelectric element 53 is used as a detecting electrode 53B. The electrode 53A and 53B are disposed aligning a longitudinal direction of the styluses 54 opposed with each other. A vibrating circuit and a control circuit shown in FIG. 16 is connected to the piezoelectric 53. In the Figure, the vibrating circuit is composed of a driving circuit 55 for applying vibrating electric current to the vibrating electrode 53A and a power supply 56 connected to the driving circuit 55. The control circuit is composed of an amplitude-DC level converting circuit 57 for converting amplitude of the detected signal detected by the detecting electrode 53B into DC (direct current) level and a touch trigger signal generating circuit 58 for generating a touch trigger signal in accordance with the signal outputted from the amplitude-DC level converting circuit 57 (conventional art 3).

In the conventional art 3, the vibration detecting direction of the vibrator of the piezoelectric element 53 is basically monoaxial. However, since the piezoelectric element 53 expands and contracts in accordance with vibration in intersecting direction, the vibration of the vibrator oriented in the intersecting direction can be detected.

However, though the vibration in basic direction can be sufficiently detected, the vibration in a direction intersecting the basic direction can be insufficiently detected on account of indirect signal detection, resulting in dispersion in detection property of respective styluses. Accordingly, it may be preferable to provide a vibration detecting means to each vibrator in spite of complexity of the structure.

In the conventional art 3, for ensuring sufficient output level of the signal sent to the amplitude-DC level converting circuit 57, a detection signal S is generated by analogue-adding a detection signal S1 detected by one piezoelectric element 53 and another detection signal S2 detected by the other piezoelectric element 53, as shown in FIG. 17.

Since the detection signal S is generated by analogue-adding each detection signal S1 and S2, direct waveform fluctuation occurred to one detection signal is flattened by the other detection signal, thereby blunting waveform fluctuation of the detection signal S immediately after contact, as shown in FIG. 18.

More specifically, when only the individual detection signal S1 is amplitude-DC-level-converted, it takes detection delay t1 for the signal S1 to initially damp to detection trigger level of the touch trigger signal from initiation of contact. When only the individual detection signal S2 is amplitude-DC-level-converted, it takes detection delay t2 for the signal S2 to initially damp to detection trigger level of the touch trigger signal from initiation of contact. On the other hand, when the detection signal S adding the detection signal S1 and S2 is amplitude-DC-level-converted, detection delay t for the signal S to initially damp to detection trigger level of the touch trigger signal from initiation of contact is larger than t1 and t2, since the waveform of the detection signal S is blunted by adding S1 and S2 of different system.

In addition, since the detected signal S is of single system, initial behavior of the signal waveform does not reach the detection trigger level if the behavior of the signal waveform changes, thereby losing great response time before reaching the detection trigger level by the subsequent behavior as shown in FIG. 19.

FIG. 19 shows error factor of repeating measurement. The detection signal S of the least delay has detection delay t from the start of contact to initially damp to the detection trigger level of the touch trigger signal. On the other hand, the waveform of the same system signal can be fluctuated in repeating measurement. The detection delay of the detection signal S' having fluctuated waveform is t'. The time difference (t'−t) composes dispersion error of detection delay.

SUMMARY OF THE INVENTION

An object of the present invention is to provide a touch signal probe which can measure highly accurately being made in cross-shaped formation and allows size reduction. Accordingly, the vibrator is vibrated by a mode resonance having high Q value when the cross-formed vibrator is resonantly vibrated.

Specifically, a touch signal probe according to the present invention is for detecting contact to a workpiece by a change in vibration in contacting the workpiece. The touch signal probe has: a stylus support of which center is an origin of X, Y and Z-axis orthogonal with each other; a vibrator provided to the stylus support and having a stylus attached along at least one of the X-axis and Y-axis; and a vibrating/detecting means disposed to a side of the stylus support perpendicular to the Z-axis of the stylus support for vibrating the vibrator at a predetermined frequency and for detecting vibration change caused when the stylus contacts the workpiece. The touch signal probe is characterized in that the vibrator is vibrated at a vibration frequency equal to either one of primary intrinsic frequency $\omega1$ or secondary intrinsic frequency $\omega2$ ($\omega2 \neq \omega1$) of the vibrator, and that the vibration change caused when the stylus contacts the workpiece is amplified by superposing vibration component of the other one of primary intrinsic frequency $\omega1$ or secondary intrinsic frequency $\omega2$ in the vibration caused when the stylus contacts the workpiece.

Incidentally, the primary intrinsic frequency $\omega1$ and the secondary intrinsic frequency $\omega2$ is unique to the vibrator.

According to the present invention, the touch signal probe is moved to touch the workpiece in measurement while the vibrator is vibrated at a vibration mode having high Q value by the vibrating/detecting means, at a frequency equal to the secondary intrinsic frequency $\omega2$, for instance, to make resonance. Since the vibration at the secondary intrinsic frequency (secondary mode resonance) has small response amplitude notwithstanding high Q value, a vibration component of the primary intrinsic frequency $\omega1$ is superposed to amplify the vibration change.

By the above vibrator and vibrating direction, since the magnitude of amplitude at the pointed end of the stylus of the vibrator is not decreased as compared to the vibration at the primary intrinsic frequency even in the vibration at the secondary intrinsic frequency, the vibration of the stylus can be sure to restrained by the contact to the workpiece, thereby securely causing vibration change by the contact. Accordingly, the vibration of the stylus is securely restricted and is accurately detected by the vibrating/detecting element.

Furthermore, since the stylus can be disposed coplanarly, the size of the touch signal probe can be reduced even when the stylus is supported by the stylus support crosswise.

The touch signal probe according to the present invention may further include a beat signal component sampling means for detecting a beat signal generated by superposing the primary intrinsic frequency $\omega1$ and the secondary intrinsic frequency $\omega2$.

According to the above arrangement, since beat cycle of the beat signal is determined by a difference between the two frequencies, the frequency of the beat signal component is quite different from the intrinsic frequency. Accordingly, the generated beat signal component can be easily sampled by a filter or a resonator, thereby positively detecting superposition of the primary intrinsic frequency $\omega1$ and the secondary intrinsic frequency $\omega2$ to positively detecting the vibration generated in contact. Therefore, S/N (signal-to-noise ratio) can be improved.

The stylus may preferably include first pair of stylus attached along the X-axis and symmetrically disposed with the origin positioned therebetween and second pair of stylus attached along the Y-axis and symmetrically disposed with the origin positioned therebetween.

According to the above, a cross stylus arrangement having styluses respectively extending from four sides of the stylus support in X and Y-axis direction can be attained.

On the other hand, the stylus may also be preferably provided to the stylus support along either one of the X-axis and Y-axis, and a balance member may be provided to a portion of the stylus support along either one of the X-axis or the Y-axis of the stylus support having no stylus thereto, the balance member being shaped to be dynamically equivalent to the stylus.

Accordingly, an accurate measurement is possible even in an irregularly-structured vibrator having styluses along only either one of the X-axis or the Y-axis on the stylus support, since the balance member balances with the stylus in vibration.

Another object of the present invention is to provide a touch signal probe which can reduce detection delay and improve detecting power dispersion between styluses to eliminate measurement error.

For the object, a plurality of detecting means (not vibrating means) is disposed correspondingly to a plurality of styluses in the present invention and a plurality of detection signal respectively obtained by the detecting means is independently used without combining with each other.

Specifically, a touch signal probe according to the present invention is for detecting contact to a workpiece. The touch signal probe includes: a stylus support provided to a probe support; a vibrator radially and projectingly formed to the stylus support, the vibrator including a plurality of styluses having contact portion for touching workpiece at a pointed end thereof; a vibrating means disposed to the stylus support for vibrating the stylus at a frequency approximately coincident with an intrinsic frequency of the vibrator; a detecting means provided to the stylus support for detecting the vibration which changes when the contact portion touches a workpiece; and a control means for arithmetically processing a detection signal detected by the detecting means to generate a contact trigger signal. The touch signal probe is characterized in that the detecting means is disposed to the stylus support in plural respectively corresponding to the plurality of styluses, and the control means separately uses a plurality of detection signal obtained by the plurality of detecting means without combining with each other so that the vibration change in accordance with the contact of the contact portion to the workpiece can be detected without depending on styluses not touching the workpiece and a direction in which the contact portion touches the workpiece.

According to the present invention, when the touch signal probe is moved so that the contact portion touches the workpiece in measurement, the vibrator is vibrated by the vibrating means to make resonance. When the contact portion of the stylus touches the workpiece while the vibrator is resonated, the detection signal detected by the detecting means varies. A touch trigger signal is generated by being processed by the control means.

Accordingly, the vibrating and detecting can be simultaneously conducted in all the direction of the stylus so that the detection can be done under the same condition whichever contact portion of the plurality of styluses contacts the workpiece. Therefore, the dispersion of detection power between each stylus can be cancelled.

Furthermore, since the detection signal detected by respective detecting means can be processed independently without adding, the detection signal from each detection signal does not interfere with each other. Accordingly, the signal which changes sharply can be detected without blunting, thereby shortening detection delay.

In the present invention, the control means may preferably generate separate touch trigger signal individual to each processing system by separately signal-processing the plurality of detection signals independently obtained by the plurality of detecting means and selecting first-arrived signal of the individual touch trigger signal generated from all of the processing system to make an overall touch trigger signal, thereby detection delay from an initiation of the contact portion to the workpiece to a generation of the overall touch trigger signal does not depend on styluses not touching the workpiece and the direction in which the contact portion touches the workpiece.

According to the above arrangement, since the first generated touch trigger signal within the plurality of touch trigger signal generated by independently signal-processing by respective signal system is used as a single touch trigger signal, the detection delay of sensor can be minimized even when waveform of the detection signal in each system is varied in repeated measurement, thereby reducing the detection delay.

In other words, when the measurement is repeated, the system detection signal having shortest arriving time is determined for generating contact trigger signal. Even if the signal waveform of the system is changed, the touch trigger signal is generated by another system detection signal having the second shortest arriving time, thereby always minimizing the detection delay.

The plurality of detecting means may preferably be independently disposed on first side of the stylus support, and the vibrating means may be disposed in plural to second side of the stylus support opposite to the first side with the stylus positioned therebetween.

According to the above arrangement, since the detecting means and the vibrating means are oppositely disposed on both sides of the base end of the stylus, the detecting means and the vibrating means can be closely disposed on both sides of the base end of the stylus, thereby securely vibrating the stylus adjacently to the stylus by the vibrating means and detecting the change of the vibration by the detecting means.

BRIEF DESCRIPTION OF THE DRAWINGS

FIG. 1 is a perspective view showing a touch signal probe according to the first embodiment of the present invention;

FIG. 2(A) is a rough top plan view showing basic structure of a vibrator for showing vibration mode of the vibrator of the first embodiment;

FIG. 2(B) is a rough top plan view showing primary mode resonance for showing vibration mode of the vibrator of the first embodiment;

FIG. 2(C) is a rough top plan view showing secondary mode resonance for showing vibration mode of the vibrator of the first embodiment;

FIG. 3(A) is a rough top plan view showing basic structure of a vibrator of the conventional art shown in FIG. 12 for showing linear vibration mode of the vibrator;

FIG. 3(B) is a rough top plan view showing primary mode resonance for showing linear vibration mode of the vibrator of the conventional art shown in FIG. 12;

FIG. 3(C) is a rough top plan view showing secondary mode resonance for showing linear vibration mode of the vibrator of the conventional art shown in FIG. 12;

FIG. 4(A) is a graph showing resonance characteristic of the vibrator of the first embodiment representing ordinary condition;

FIG. 4(B) is a graph showing resonance characteristic of the vibrator of the first embodiment representing amplitude at the secondary intrinsic frequency being made substantially the same level as the amplitude at the primary intrinsic frequency;

FIG. 6 is a graph showing a relationship between time and DC-level-converted amplitude;

DETAILED DESCRIPTION OF PREFERRED EMBODIMENT(S)

Figure 5:
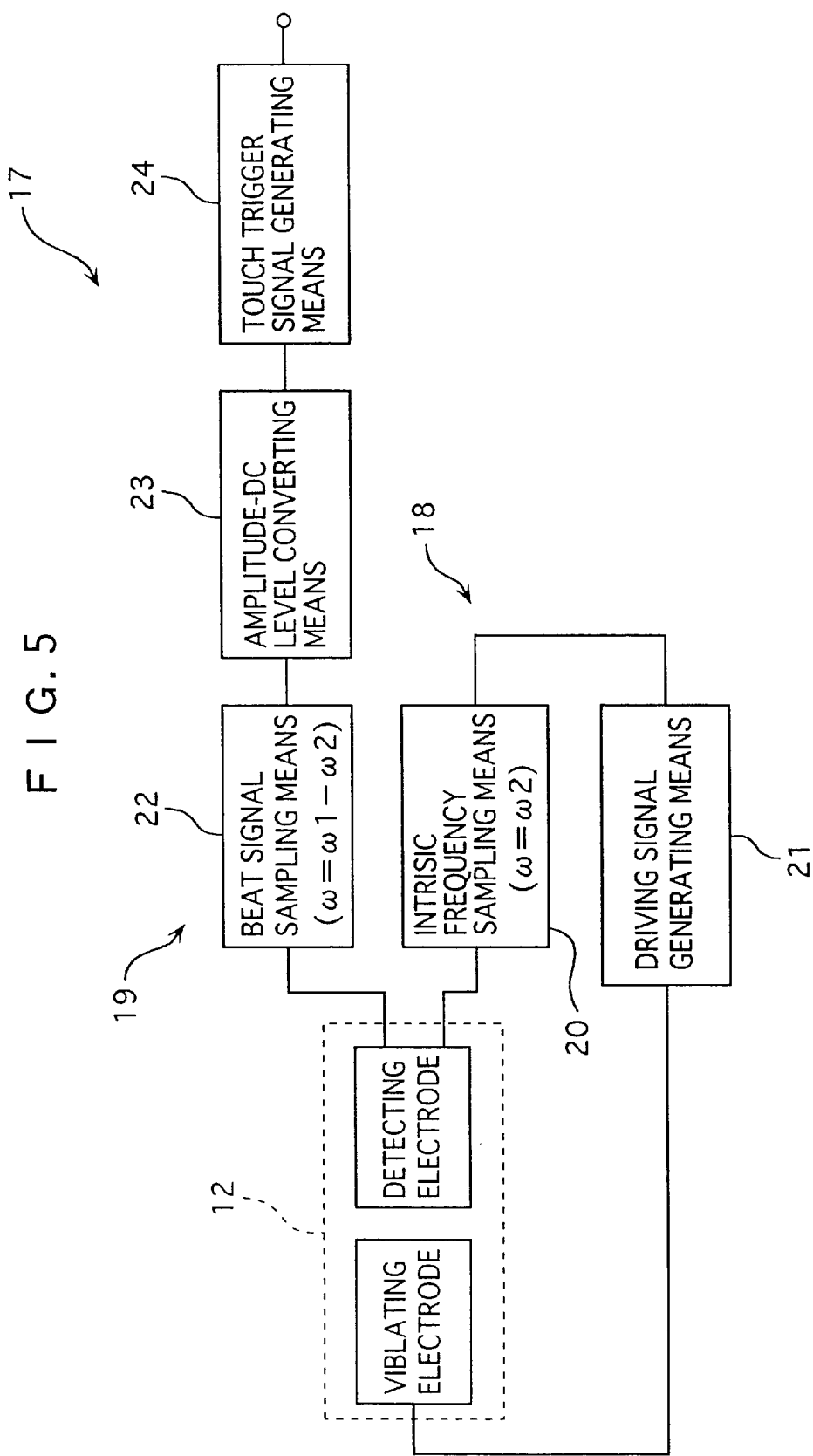
FIG. 5 is a block diagram showing a specific structure of a control circuit of the first embodiment.

A preferred embodiment for implementing the present invention will be described below in detail with reference to attached drawings. Incidentally, the same sign is applied to common elements in respective embodiments to omit and/or abbreviate description thereof.

FIG. 1 to FIG. 6 show first embodiment of the touch signal probe according to the present invention.

In FIG. 1, the touch signal probe has a vibrator 16 comprising a stylus support 10 and stylus 13 attached thereto, a piezoelectric element 12 as a vibrating/detecting means for vibrating the vibrator 16 and for detecting condition of vibration which changes when the stylus 13 touches a workpiece, and a control circuit 17 for detecting the change of vibration condition of the vibrator 16 detected by the piezoelectric element 12 to transmit a touch trigger signal.

The stylus support 10 is an approximate rectangular-solid-shaped block having a center corresponding to an origin of X, Y and Z-axis and square plane perpendicular to the Z-axis. The piezoelectric element 12 is adhered to locating projections 11 projectingly provided to four corners of upper and lower plane of the stylus support (only one piezoelectric element 12 is shown in FIG. 1). A total of four styluses 13 is disposed at the center of respective sides of the stylus support 10, the styluses 13 composed of a pair of first styluses and another pair of second styluses respectively aligning with the X and Y-axis direction and being symmetric relative to the origin. Each of the styluses 13 has a contact ball 13a at a pointed end thereof for touching the workpiece, and base end of each stylus 13 is fixed to the stylus support 10 by adhesion, and welding and the like.

The stylus support 10 is mounted to an approximately cylindrical probe body 15 extending in the Z-axis. The probe support 15 is inserted to the central portion of the piezoelectric element 12 being spaced apart at a predetermined gap.

The piezoelectric element 12 shaped in a flat plate having square plane is disposed on a plane perpendicular to the Z-axis. A surface electrode of the piezoelectric element 12 is divided into at least four parts and a common electrode is provided to reverse surface.

The surface electrode of the piezoelectric element 12 is divided into a vibrating electrode for vibrating the stylus 13 along an axial direction (radial direction) and a detecting electrode extending separately in positive direction and negative direction.

A plurality (e.g. four) of piezoelectric element may be used in the first embodiment and each of the piezoelectric elements may be used only for either vibrating or detecting in the first embodiment. In the first embodiment, the sensitivity is the highest when the stylus 13 contacts the workpiece in a direction aligning the axial direction thereof.

The measurement principle of the first embodiment using the control circuit 17 will be described below.

FIG. 2 shows vibration mode of the vibrator 16. FIG. 2(A) shows a basic structure, 2(B) shows primary mode of resonance, and 2(C) shows secondary mode of resonance.

In FIG. 2, a vibration in a radial direction is applied to each stylus 13 of the vibrator 16. Each adjoining stylus 13 vibrates in a similar manner in the respective direction. However, the phase of the vibration is inverse in the primary mode shown in FIG. 2(B) and the same in the secondary mode shown in FIG. 2(C). The phase difference is an eminent characteristic in vibrating the stylus in radial direction.

Figure 12:
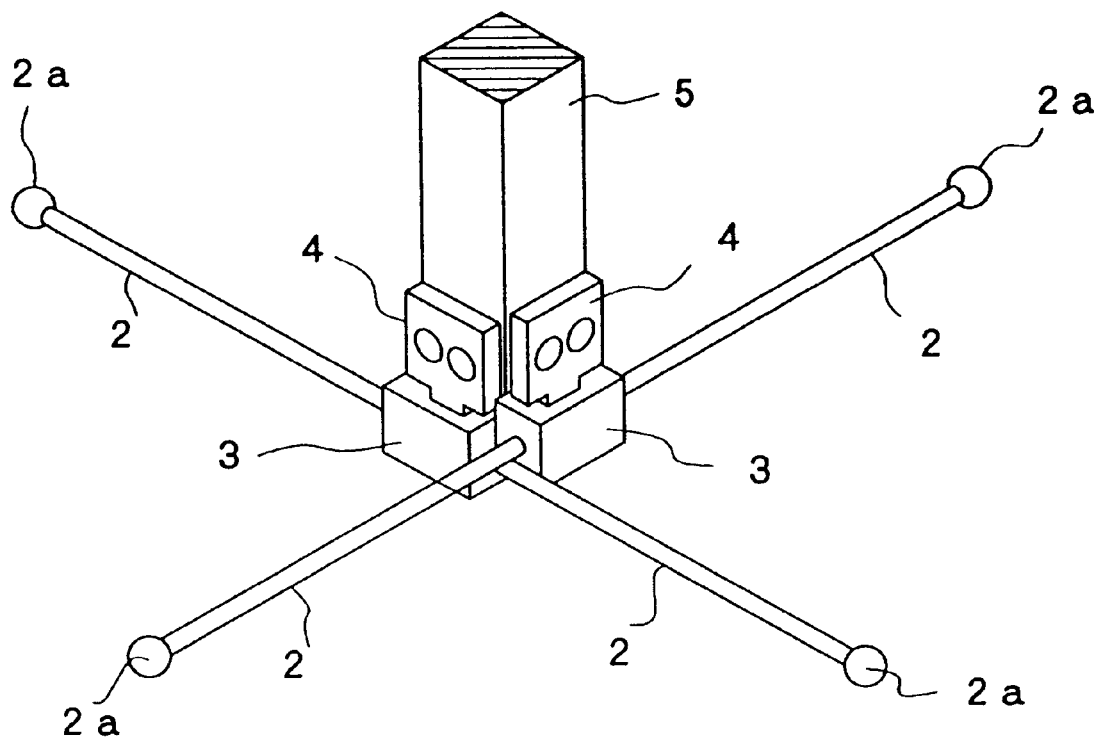
FIG. 12 is a perspective view showing a touch signal probe according to conventional art 1.
Figure 13A:
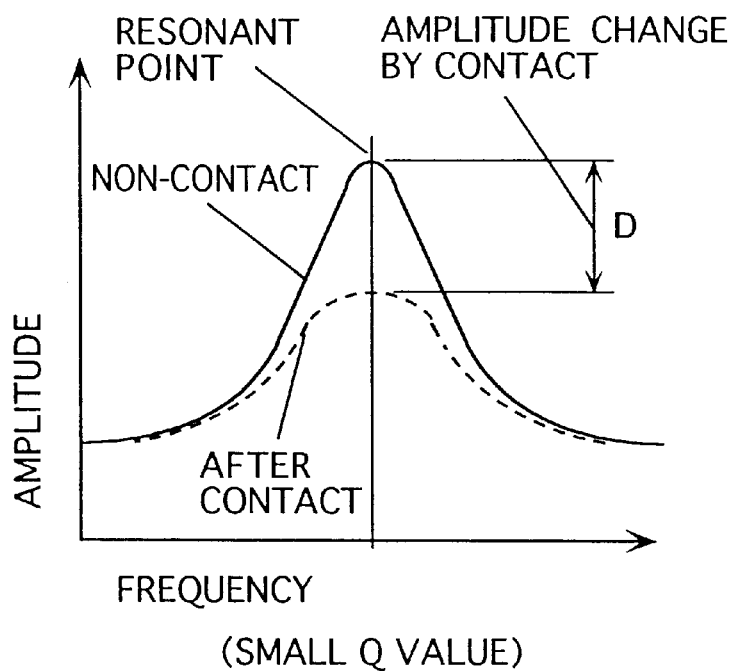
FIG. 13(A) is a graph showing a relationship between frequency and amplitude of small Q value.
Figure 13B:
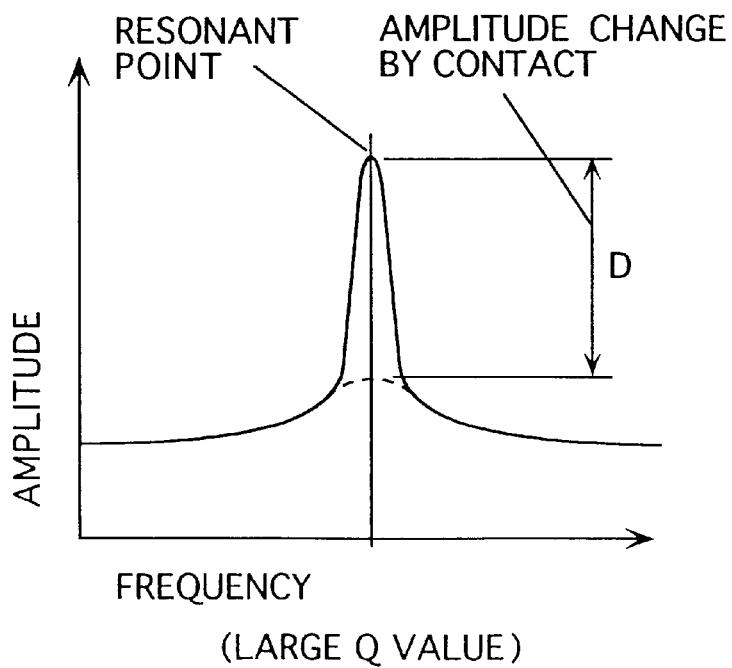
FIG. 13(B) is a graph showing a relationship between frequency and amplitude of large Q value.
Figure 14A:
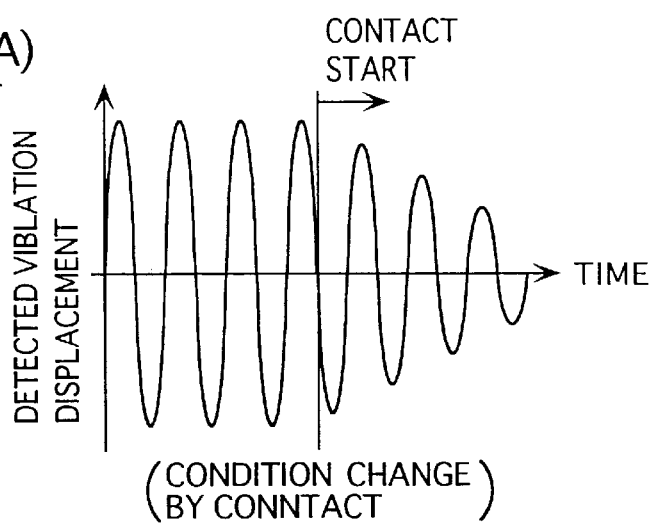
FIG. 14(A) is a graph showing a relationship between time and vibration displacement caused by contact of the stylus to the workpiece.
Figure 14B:
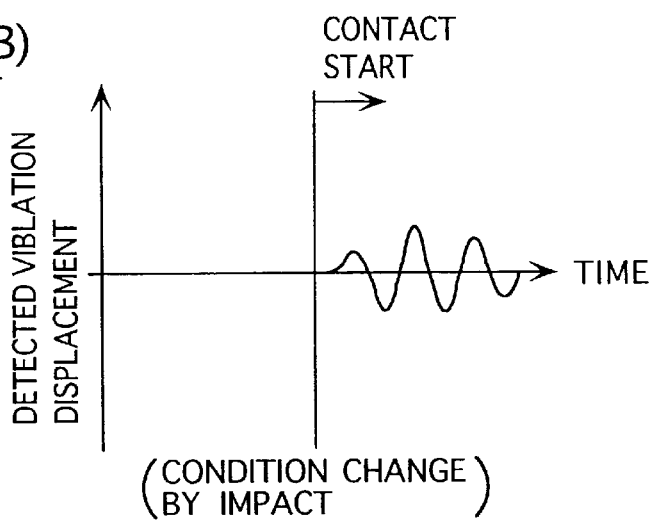
FIG. 14(B) is a graph showing a relationship between time and vibration displacement caused when the stylus collided with the workpiece.
Figure 14C:
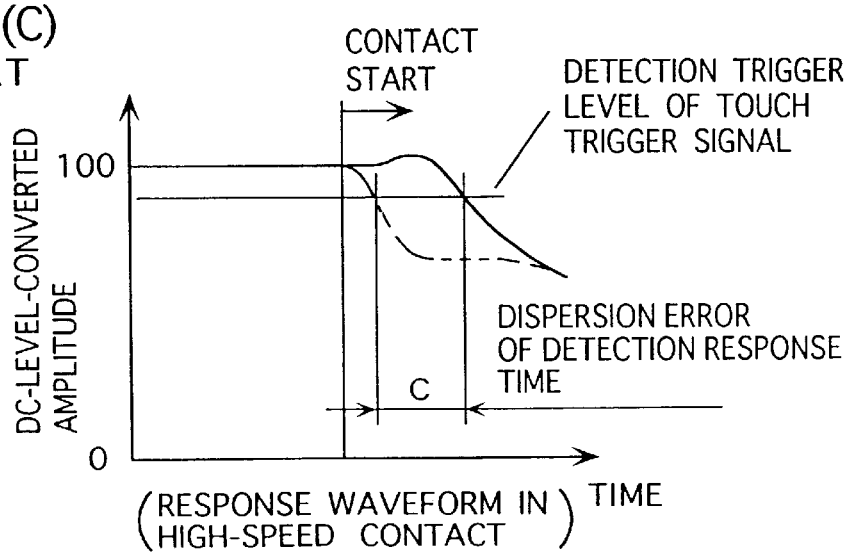
FIG. 14(C) is a graph showing a relationship between time and DC-level-converted amplitude.
Figure 15:
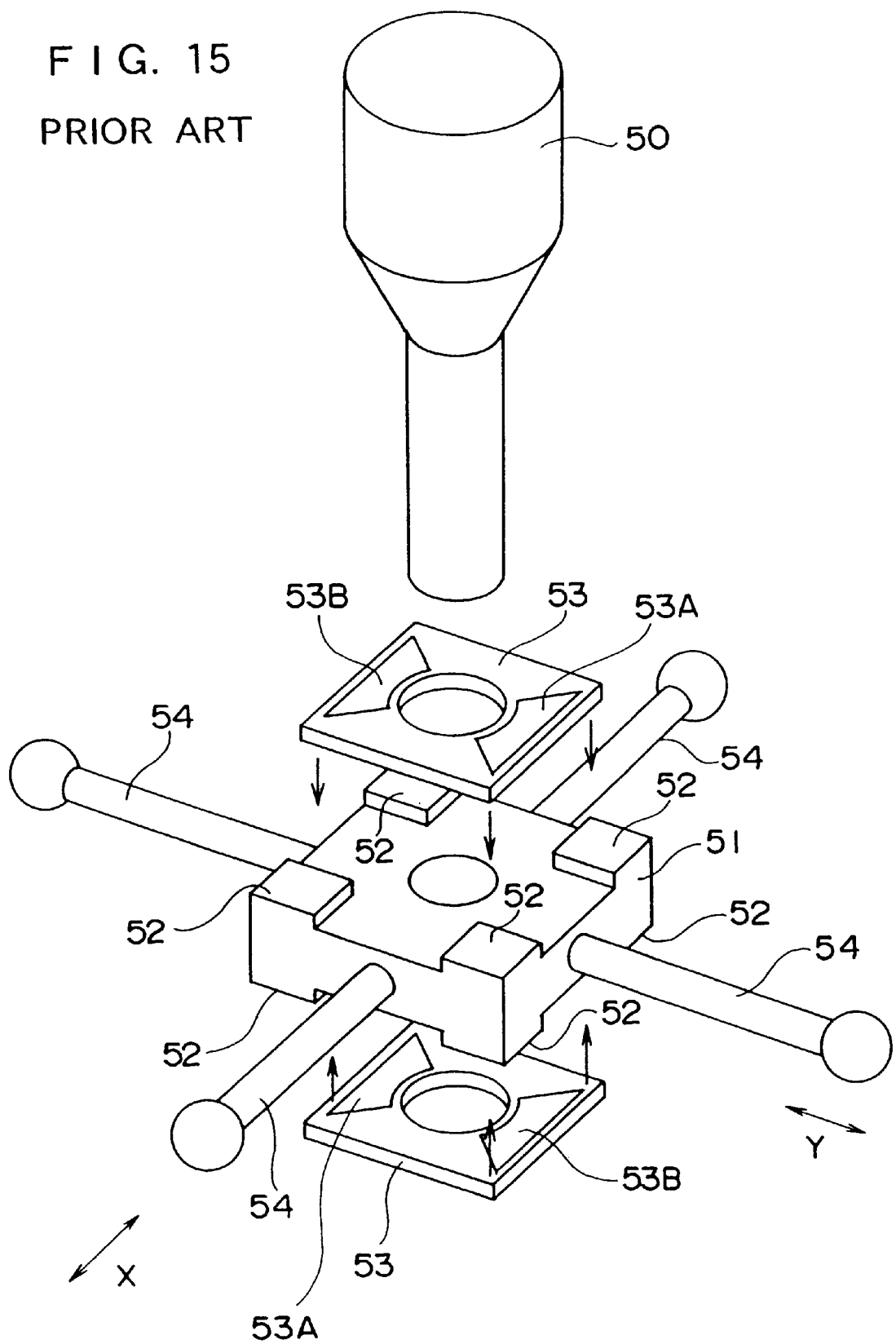
FIG. 15 is an exploded perspective view showing a touch signal probe according to conventional art 3.
Figure 16:
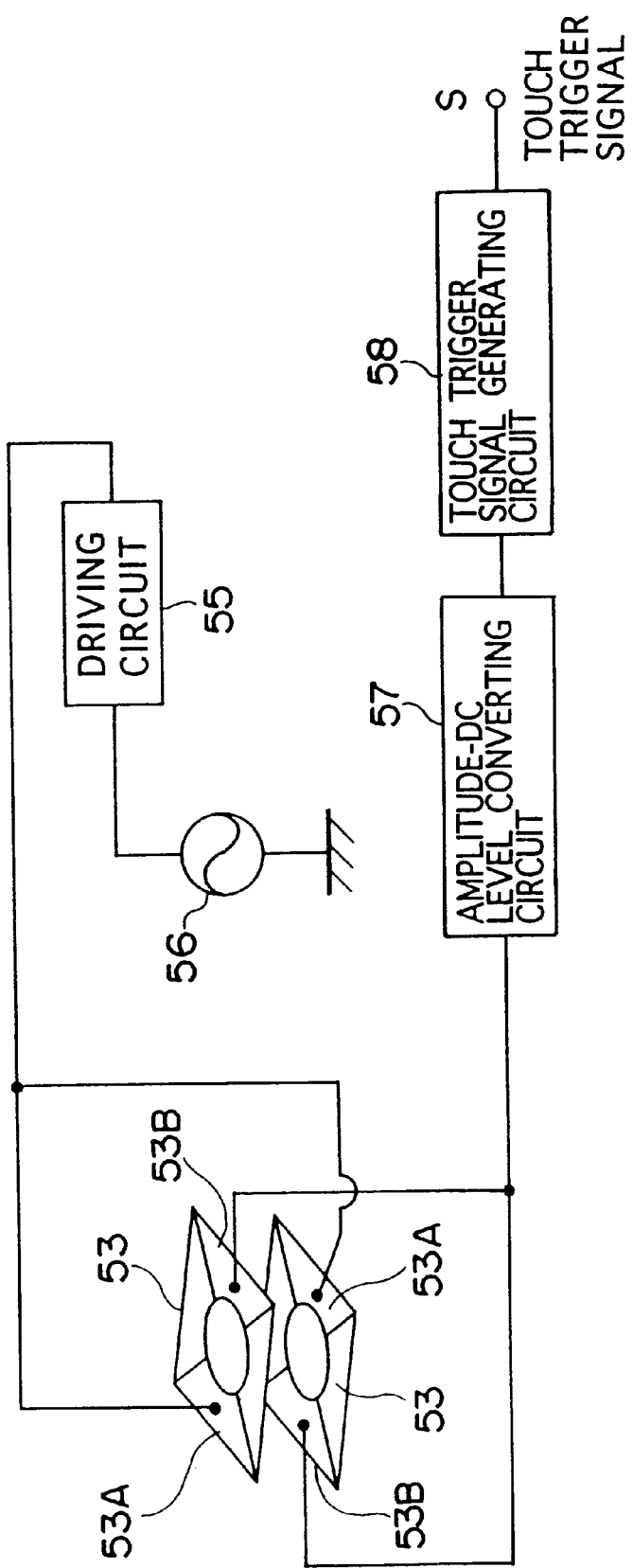
FIG. 16 is a block diagram showing a structure of a vibrating circuit and detecting circuit of the touch signal probe according to the conventional art 3.
Figure 17:
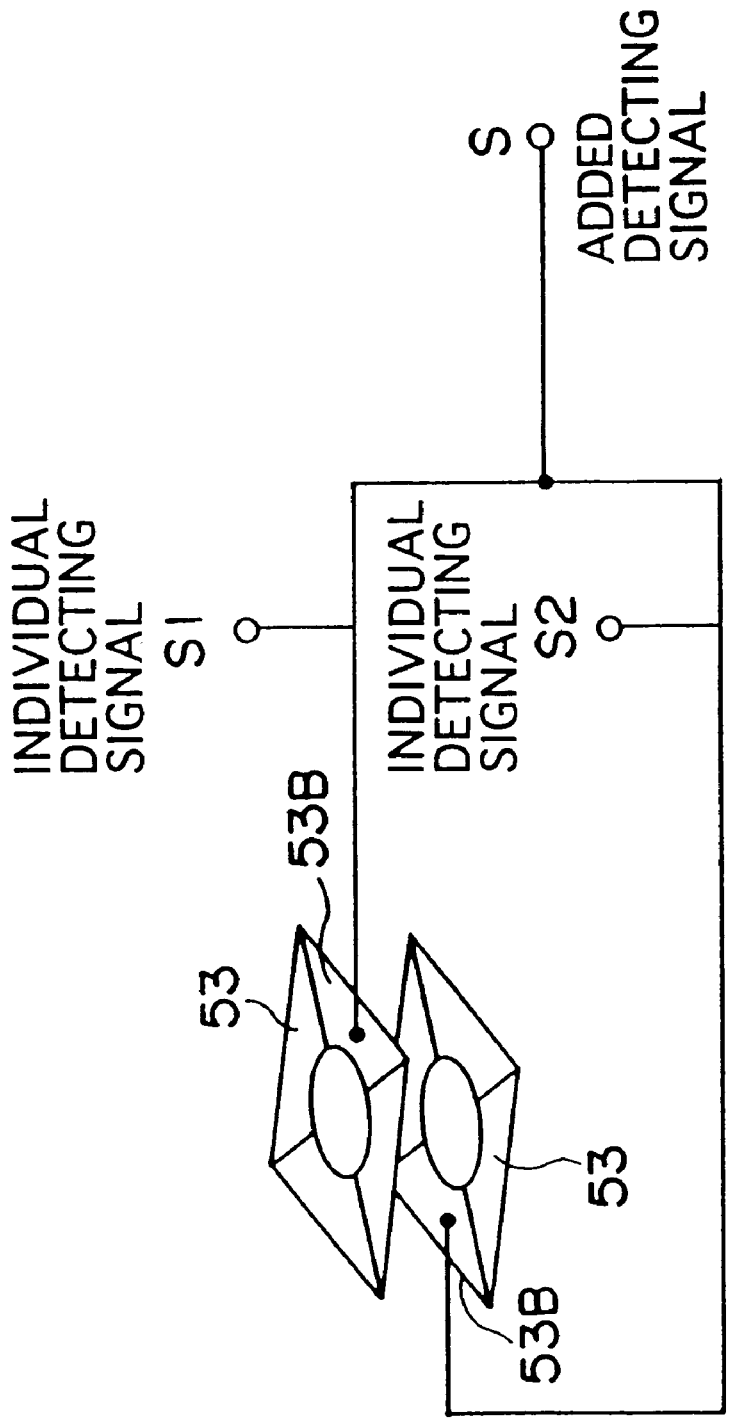
FIG. 17 is a view showing an outline of structure of detecting circuit of the touch signal probe according to the conventional art 3.
Figure 18:
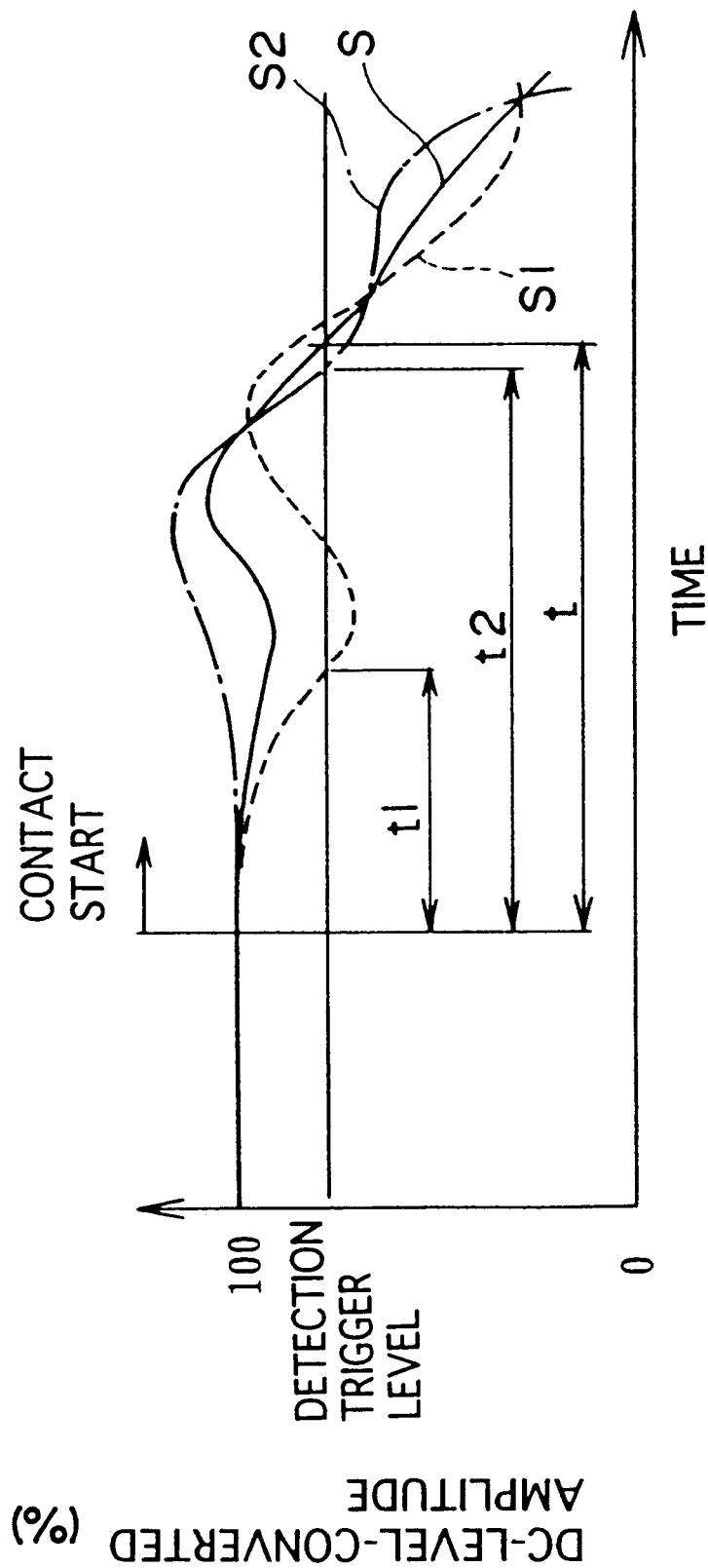
FIG. 18 is a graph showing a relationship between time and DC-level-converted amplitude of the touch signal probe according to conventional art 3.
Figure 19:
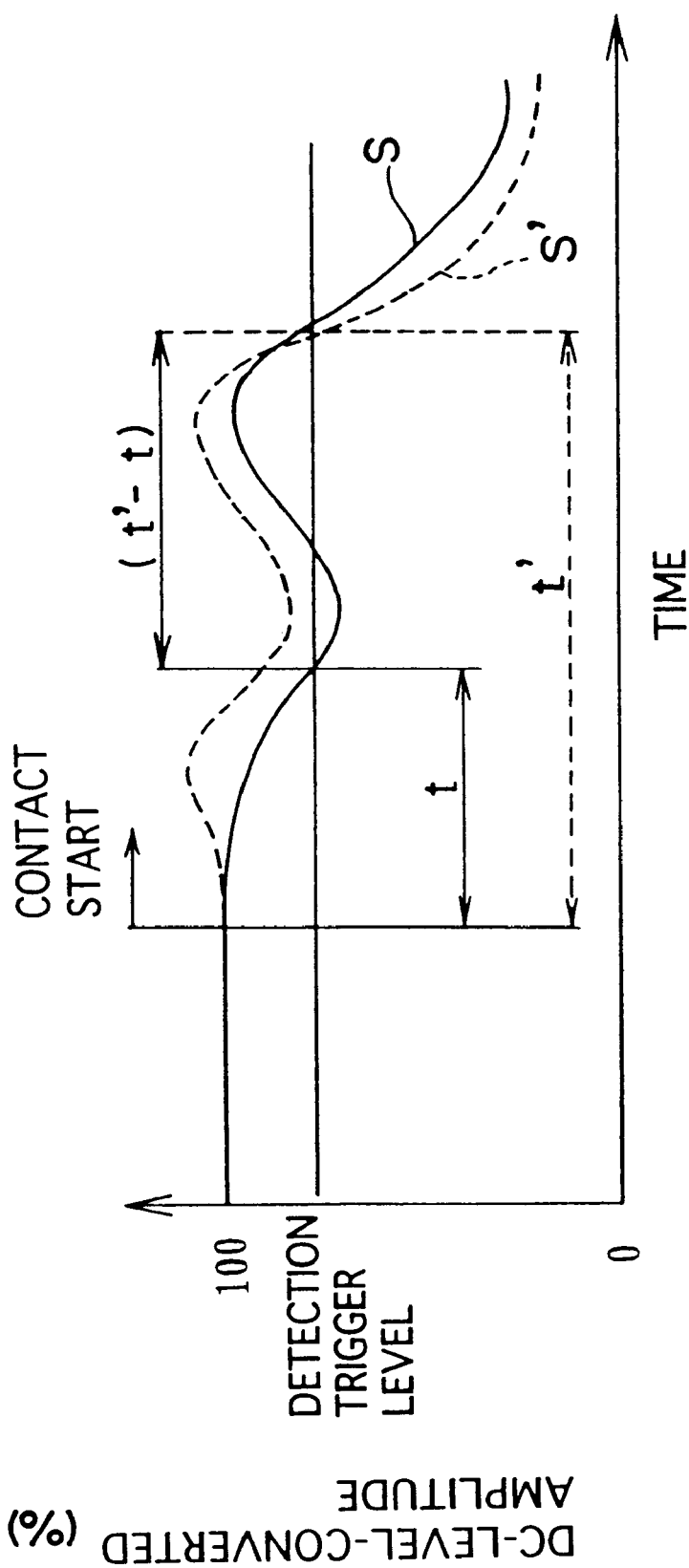
FIG. 19 is a graph showing a relationship between time and DC-level-converted amplitude of the touch signal probe according to conventional art 3 when measurement is repeated.

The vibration mode of above-described conventional linear vibrator shown in FIG. 12 is herein described for comparison. In FIG. 3, 3(A) shows a basic structure of the vibrator, 3(B) shows primary mode resonance, and 3(C) shows secondary mode resonance.

In FIG. 3, a vibration along the axial direction is applied to each stylus 2 of the vibrator 16. In the primary mode resonance shown in FIG. 3(B), the expansion direction of the piezoelectric element 3 and the stylus 2 is of the same phase, resulting in large displacement of the pointed end of the stylus 2, however, in the secondary mode resonance shown in FIG. 3(C), the expansion direction of the piezoelectric element 3 and the stylus 2 is of reverse phase, resulting in smaller displacement of the pointed end of the stylus 2 (lower sensitivity). On the other hand, radial vibration of the stylus 13 by the piezoelectric element 12 does not lead to smaller amplitude of the pointed end of the stylus 13 as compared to the amplitude of the piezoelectric element 12 in the first embodiment, thereby obtaining sufficient sensitivity as a touch signal probe by the secondary intrinsic frequency (secondary mode resonance).

FIG. 4 is a graph showing resonance characteristic of the vibrator.

In FIG. 4(A), ordinary resonance characteristic of the vibrator 16 of FIG. 2 is shown. The amplitude of the vibration at a secondary intrinsic frequency $\omega 2$ is smaller than the amplitude of the vibration at the primary intrinsic frequency $\omega 1$ ($\omega 2 \neq \omega 1$). In this state, the change in vibration of the stylus 13 can not be surely detected. Accordingly, the amplitude at the secondary intrinsic frequency $\omega 2$ is made approximately the same as the amplitude of the primary intrinsic frequency $\omega 1$, as shown in FIG. 4(B).

In order to amplifying the amplitude at the secondary intrinsic frequency $\omega 2$, the length of the stylus 13 is adjusted. The thickness or the material of the stylus 13 may be adjusted instead of the length.

Specifically, since the length of the stylus 13 with maximum amplitude at the primary mode resonance and the length of the stylus 13 with maximum amplitude at the secondary mode resonance differ, intermediate length of these length are set using CAE (Computer Aided Engineering) technique such as FEM (Finite Element Method).

Specific structure of the control circuit 17 will be described below with reference to FIG. 5.

In FIG. 5, the control circuit 17 has a vibrating circuit 18 for controlling the drive of the vibrating electrode of the piezoelectric element 12, and a detecting circuit 19 for generating a touch trigger signal from a signal outputted by a detecting electrode of the piezoelectric element 12, where the change in vibration condition caused when the stylus 13 touches the workpiece is amplified by superposing vibration component of the primary intrinsic frequency ($\omega 1$ in the vibration caused when the stylus 13 touches the workpiece.

The vibrating circuit 18 includes intrinsic frequency sampling means 20 for detecting a vibration signal outputted by the detecting electrode of the piezoelectric element 12 and for sampling the secondary intrinsic frequency $\omega 2$ of the vibrator 16, and a driving signal generating means 21 for receiving a signal from the intrinsic frequency sampling means 20 and vibrating the vibrating electrode of the piezoelectric element 12 at the secondary intrinsic frequency $\omega 2$ of the vibrator 16.

The detecting circuit 19 has a beat signal component sampling means 22 for detecting beat signal generated by superposing the primary intrinsic frequency $\omega 1$ and the secondary intrinsic frequency $\omega 2$, an amplitude-DC-level converting means 23 for converting the signal outputted by the beat signal component sampling means 22 into an amplitude-DC level, and a touch trigger signal generating means 24 for generating a touch trigger signal from the signal outputted by the amplitude-DC-level converting means 23. The amplitude-DC-level converting means 23 and the touch trigger signal generating means 24 have similar structure as in the conventional art, where a coordinate value of the touch signal probe when the touch trigger signal generating means 24 transmits a signal is read in as a measurement value. Incidentally, the beat signal probe sampling means 22 may be omitted in the first embodiment.

The beat signal component sampling means 22 is described below.

Generally speaking, a vibration in a main vibration system of a two-degree-of-freedom vibration system is represented in the following formula:

$$x(t)=X \sin(\omega 1 t+\phi 1)+Y \sin(\omega 2 t+\phi 2) \quad (1)$$

$\omega 1$ is the primary intrinsic frequency of the vibration system, $\omega 2$ is the secondary intrinsic frequency, and $\phi 1$ and $\phi 2$ are optional constants.

When a resonant condition is created by vibrating the vibration system at, for example, the second frequency $\omega 2$, apparent vibration can be regularly represented by the following formula, since the second vibration prevails dominative:

$$x(t)=+Y'\sin(\omega 2 t+\phi 2) \quad (2)$$

When the vibrator 16 starts to contact the workpiece, the vibration condition represented by formula (2) changes into formula (1) on account of change in resonance condition. In other words, other vibration component having different frequency to the vibrated resonant frequency is generated to begin to superpose when the vibrator 16 touches the workpiece.

More specifically, the amplitude-DC-level-converted detection signal when the stylus 13 starts to touch the workpiece is shown in a graph of FIG. 6.

In FIG. 6, the DC-level-converted amplitude is lowered while vibrating in accordance with the time elapsed. This is because the primary intrinsic frequency (first vibration mode) is superposed to the second vibrating intrinsic frequency (second vibration mode) and a fluctuation K having a cycle corresponding to the difference between the primary intrinsic frequency and the secondary intrinsic frequency appears. Accordingly, the fluctuation of the signal by the contact is amplified as compared to vibrating the vibrator 16 at the primary intrinsic frequency (shown in dotted line in FIG. 6), thereby enhancing apparent sensitivity and responsiveness of the cross-shaped touch signal probe by T1. Incidentally, the signal waveform processed only by the amplitude-DC-level-converting means 23 without using beat signal component sampling means 22 is shown in FIG. 6.

Further, since the vibration component excited by impact force in contact is mainly of the primary intrinsic frequency $\omega 1$ having lower Q value (likely to be influenced by external force), the vibration component excited by impact force is not likely to be unstable by overlapping the vibrating vibration component. This is because the secondary intrinsic frequency $\omega 2$ is used for applying vibration and the frequency is entirely different from the vibration component excited by the impact force. Rather, the excited first intrinsic vibrating component amplifies the fluctuation of the signal caused by contact to improve apparent sensitivity and responsivity of the touch signal probe. Accordingly, the dispersion error of the detection response time of the touch signal probe can be decreased even in high-speed contact speed.

The beat signal shown in FIG. 6 is generated by superposing the primary intrinsic frequency $\omega 1$ and the secondary intrinsic frequency $\omega 2$ and the beat cycle K is determined by the difference of the two frequencies. Accordingly, the frequency of the beat signal component is quite different from the intrinsic frequency so that the generated beat signal component is electrically sampled by the beat signal component sampling means 22 by a filter and the resonator or the like. Incidentally, the beat signal is not generated without contact and no signal can be detected in the ordinary condition. Accordingly, it is effective in view of S/N for detection etc.

According to the above-described first embodiment, following effect can be obtained.

(1) The vibrator 16 includes a stylus support 10 with a center corresponding to the X, Y and Z-axis orthogonal with each other, and a stylus 13 attached to the stylus support 10 and fixed along the X-axis and Y-axis. And the touch signal probe has the vibrating/detecting means (piezoelectric element) 12 disposed to a side of the stylus support 10 perpendicular to the Z-axis of the stylus support 10 for vibrating the vibrator 16 and detecting the change in vibration condition caused when the stylus 13 touches the workpiece. Accordingly, the size of the touch signal probe can be minimized by disposing the stylus 13 coplanarly.

(2) Since the vibrator 16 is vibrated at a vibration frequency equivalent to the secondary intrinsic frequency $\omega_2$ of the vibrator 16 and the vibration condition change caused when the stylus 13 touches the workpiece is amplified by superposing the vibration component of the primary intrinsic frequency $\omega_1$ in the vibration caused when the stylus 13 touches the workpiece, the amplitude at the pointed end of the stylus 13 of the vibrator 16 is not lowered as compared to the vibration by the primary intrinsic frequency $\omega_1$. Accordingly, the vibration of the stylus 13 can be securely restricted by the contact to the workpiece, thereby securely causing change in vibration condition by the contact. Therefore, the vibration of the stylus 13 can be securely restricted and the vibration condition can be accurately detected by the vibrating/detecting means 12.

(3) When the beat signal component sampling means 22 for detecting the beat signal generated by superposing the primary intrinsic frequency $\omega_1$ and the secondary intrinsic frequency $\omega_2$ is provided to the control circuit 17 in the first embodiment, the beat cycle of the beat signal is determined by the difference between the two frequencies. Accordingly, the frequency of the beat signal component is quite different from the intrinsic frequency, so that the generated beat signal component can be easily electrically sampled by the filter or the resonator. Accordingly, the vibration caused in contacting the workpiece can be securely detected by detecting the superposition of the primary intrinsic frequency $\omega_1$ and the secondary intrinsic frequency $\omega_2$, thereby improving S/N.

(4) Since the stylus support 10 is formed in a rectangular solid having square X-Y plane, the center of the stylus support 10 can be easily adjusted to the origin of the X, Y and Z-axis, thereby facilitating assembly of the touch signal probe.

(5) Since the stylus 13 has the pair of the first styluses fixed along the X-axis and disposed symmetrically with the origin positioned therebetween and another pair of the second styluses fixed along the Y-axis and disposed symmetrically with the origin positioned therebetween, the stylus can be formed into a cross-shape, in which the stylus 13 extends from four sides of the stylus support 10 along the X and Y-axis.

Second embodiment of the present invention will be described below with reference to FIG. 7.

The arrangement of the second embodiment is the same as the first embodiment except for the configuration of the vibrator 26.

Figure 7:
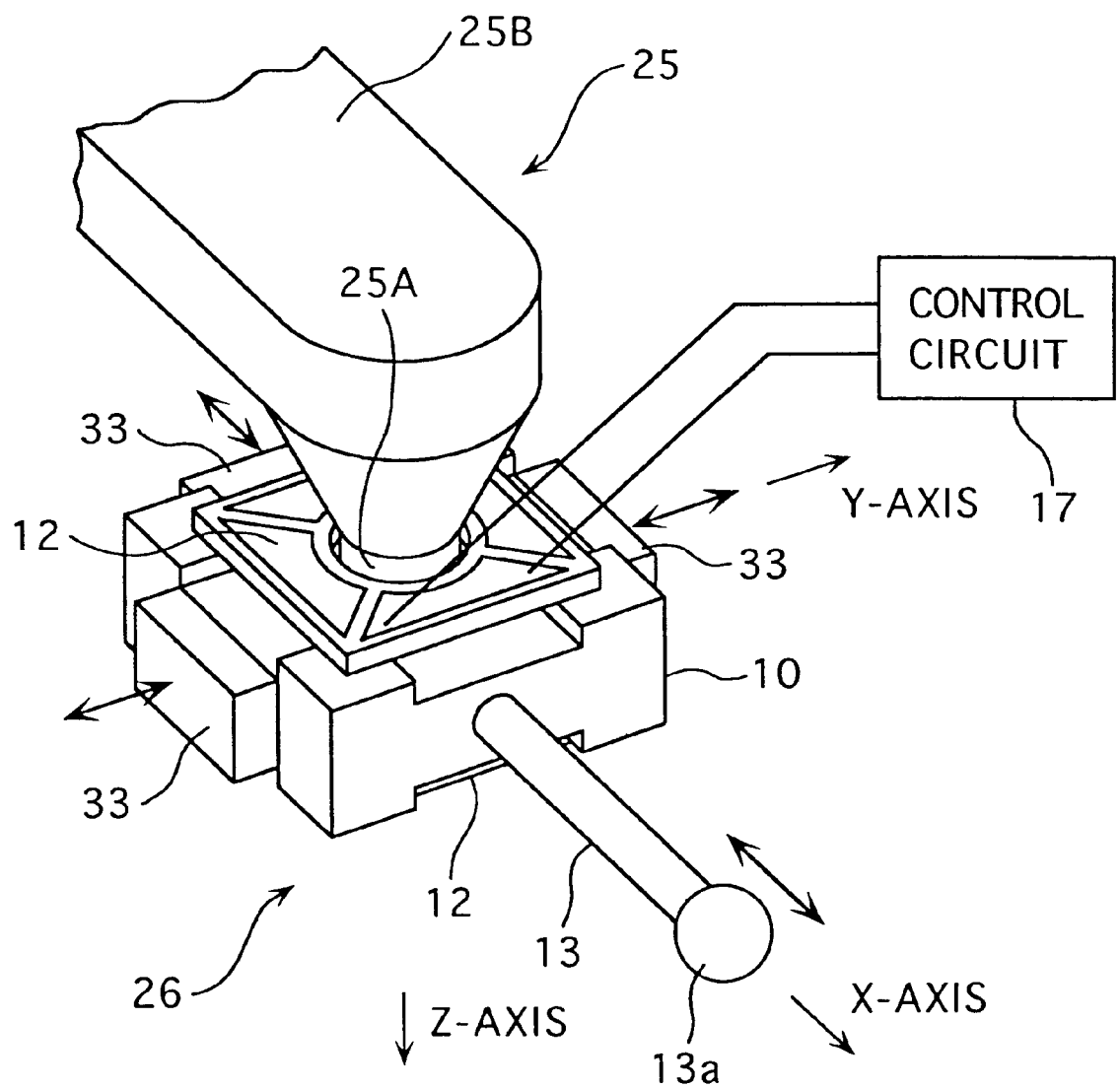
FIG. 7 is a perspective view showing a touch signal probe according to second embodiment of the present invention.
Figure 8:
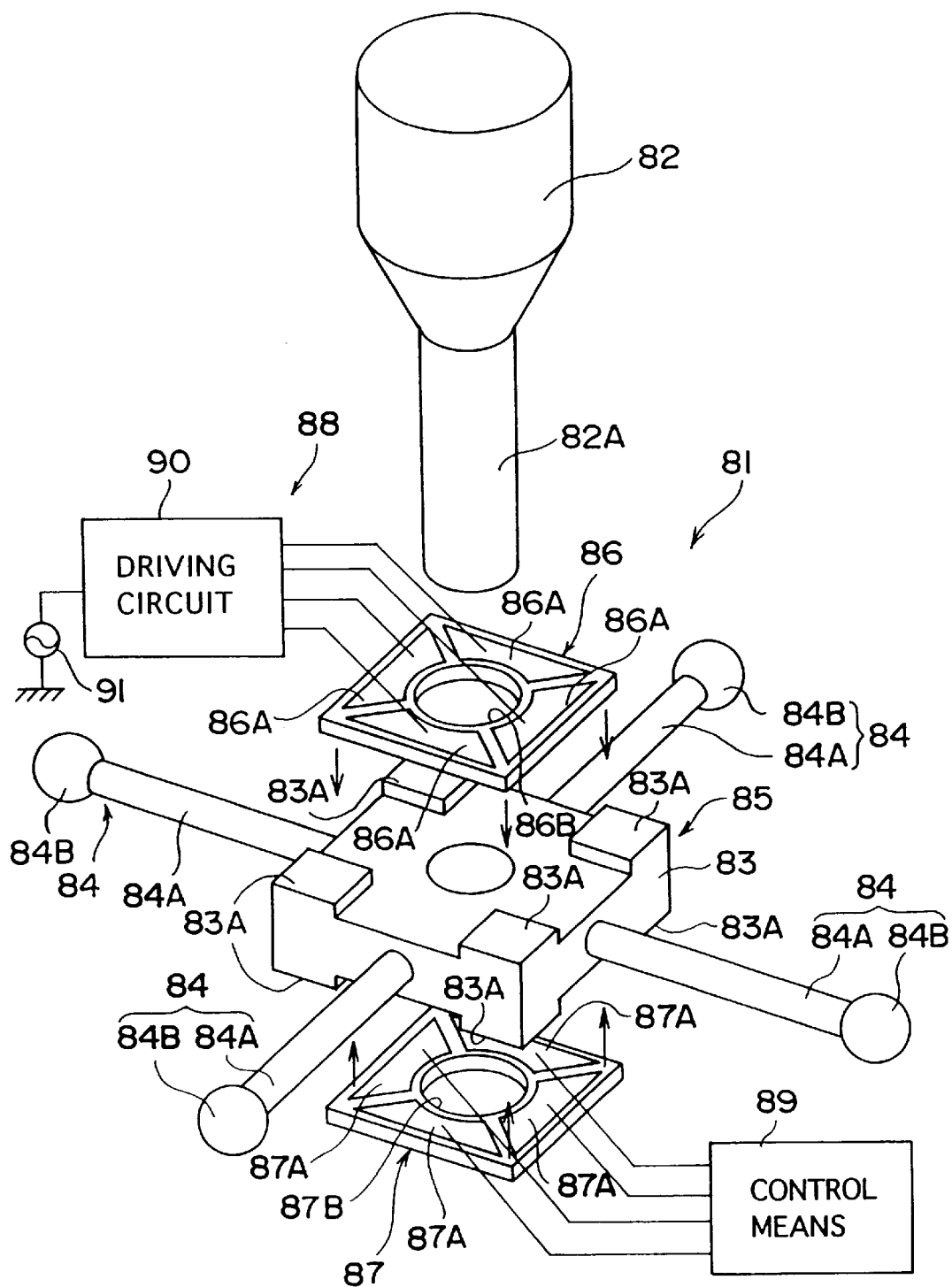
FIG. 8 is an exploded perspective view showing a touch signal probe according to third embodiment of the present invention.
Figure 9:
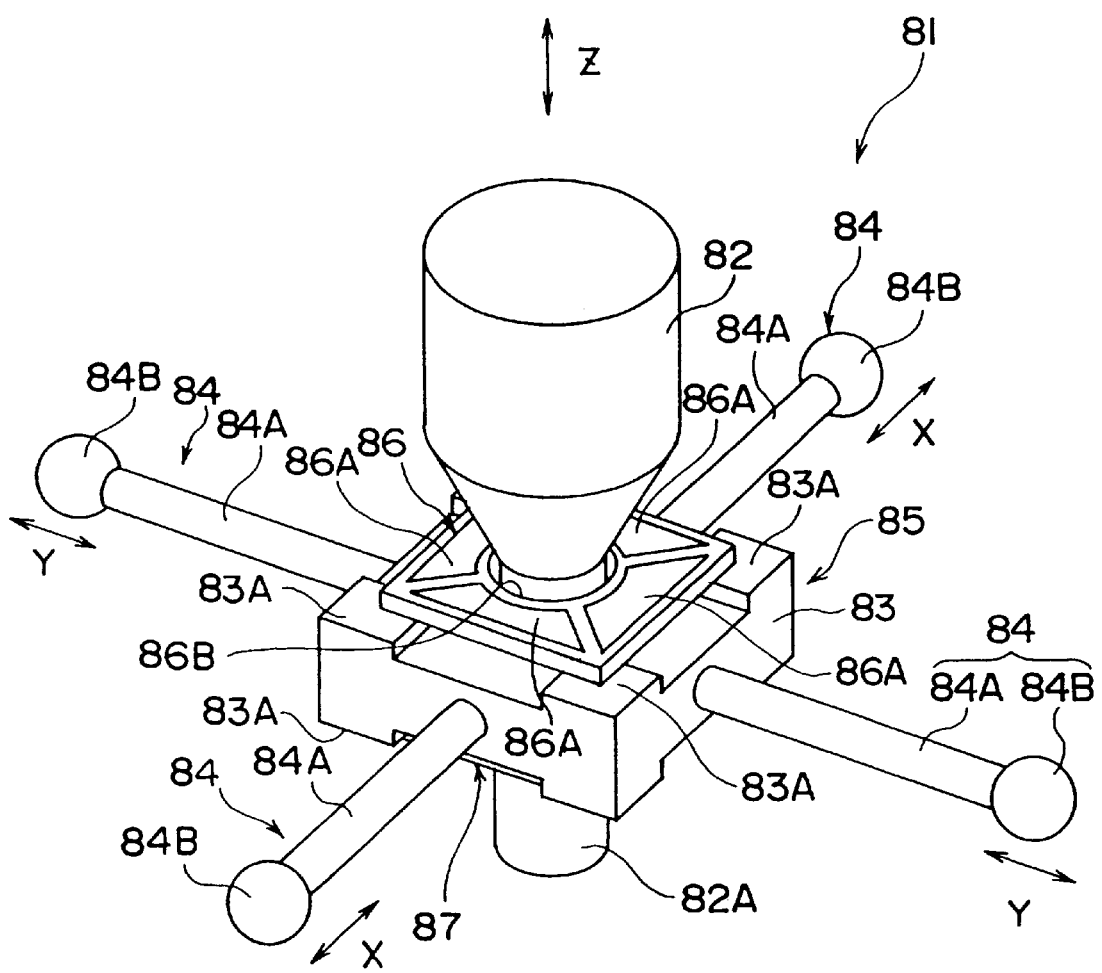
FIG. 9 is a perspective view showing the third embodiment.

A vibrator 26 of the second embodiment has the stylus support 10, the stylus 13 being provided on a side of the stylus support along the X-axis, and a balance member 33 provided along either one of X-axis and Y-axis onto a side of the stylus support 10 having no stylus 13, as shown in FIG. 7.

The balance member 33 provided on the X-axis is an approximate rectangular solid block and has dynamically equivalent configuration as the stylus 13. Whether the member is dynamically equivalent or not is determined by mass, rigidity etc. of the balance member 33.

The balance member 33 fixed to both sides of the stylus support 10 along the Y-axis has the same configuration as the balance member 33 provided on the X-axis and are disposed at a regular interval with the origin as a center thereof The piezoelectric element 12 is provided to upper and lower plane of the stylus support 10 orthogonal to the Z-axis respectively.

The balance member 33 as well as the stylus 13 vibrates along the X-axis and the Y-axis in accordance with the vibration of the piezoelectric element 12.

The stylus support 10 is attached to the probe body 25. The probe body 25 has a cylindrical portion 25A extending in Z-axis direction for supporting and fixing the stylus support 10, and a rod 25B formed integrally with the cylindrical portion 25A extending in the X-axis, the cylindrical portion 25A being inserted to the center of the piezoelectric element 12 spaced apart at a predetermined gap.

Incidentally, the stylus 13 may preferably be provided along the Y-axis. In this case, the balance member 33 is provided along the X-axis.

In the above-described second embodiment, following effect can be obtained as well as the effects (1) to (4) of the above-described first embodiment:

(6) Since the stylus 13 is provided to the stylus support 10 along either one of the X-axis or the Y-axis and the balance member 33 is provided to the sides the stylus support 10 having no stylus 13, highly accurate measurement is possible with the irregularly-structured vibrator 26 having stylus 13 provided to the stylus support 10 along either one of the X-axis or the Y-axis by being balanced by the balance member 33 with the stylus 13 in vibration.

Incidentally, the present invention includes following modifications of the first embodiment and the second embodiment.

For instance, the piezoelectric element 12 is used as the vibrating/detecting means in the above-described embodiments. However, other actuator can also be used in the present invention.

The vibrating/detecting means may be provided to only one surface of the stylus support 10.

The stylus support 10 and the piezoelectric element 12 may be formed in planar circle.

In the above-described embodiments, the vibrators 16 and 26 are vibrated at the vibration frequency equivalent to the secondary intrinsic frequency $\omega_2$ of the vibrator 16 and the vibration component of the primary intrinsic frequency $\omega_1$ in the vibration caused when the stylus 13 touches the workpiece. However, reverse arrangement is possible in the present invention, in other words, the vibrator 16 may be vibrated at a vibration frequency equivalent to the primary intrinsic frequency $\omega_1$ of the vibrator 16 and the vibration component of the secondary intrinsic frequency $\omega_2$ in the vibration generated when the stylus 13 touches the workpiece may be superposed.

Third embodiment of the present invention is shown in FIG. 8 to FIG. 11.

In these figures, a touch signal probe 81 has an approximate blockshaped stylus support 83 having a cylindrical pointed end 82A of a probe support 82 passing through at the center thereof, a vibrator 85 including four styluses 84 radially projecting in X and Y-axis direction of the stylus support 83, a vibrating piezoelectric element 86 disposed on an upper side of the stylus support 83, a detecting piezoelectric element 87 disposed on a lower side of the stylus support 83, a vibrating circuit 88 connected to the vibrating piezoelectric element 86, and a control means 89 connected to the detecting piezoelectric element 87.

The stylus support 83 is an approximately rectangular solid block of which center corresponds to an origin of the X, Y and Z-axis and having a square plane perpendicular to the Z-axis. The piezoelectric element 86 and 87 are adhered to locating projections 83A provided on four corners of upper and lower planes perpendicular to the Z-axis.

The stylus 84 includes an approximately cylindrical stylus body 84A and an approximately ball-shaped contact portion 84B provided at a distal end of the stylus body 84A, the contact portion 84B being contactable to a workpiece (not shown). The stylus body 84A of the stylus has a base end fixed to the stylus support 83 by adhesion, welding and so on.

The vibrating piezoelectric element 86 has a flat square plate-shaped plane and is disposed on a plane orthogonal to the Z-axis. The piezoelectric element 86 is divided into four vibrating electrodes 86A as vibrating means, the vibrating electrodes 86A being located to a position corresponding to the base end of the four styluses 84. Circular cut 86B is formed at the center of the piezoelectric element 86 in order to prevent interference with the cylindrical pointed end 82A of the probe support 82.

The vibrating piezoelectric element 87 has a flat square plate-shaped plane and is disposed on a plane orthogonal to the Z-axis. The piezoelectric element 87 is divided into four vibrating electrodes 87A as vibrating means, the vibrating electrodes 87A being located to a position corresponding to the base end of the four styluses 84. Circular cut 87B is formed at the center of the piezoelectric element 87 in order to prevent interference with the cylindrical pointed end 82A of the probe support 82.

In other words, the four detecting electrodes 87A are independently disposed on the lower surface of the stylus support 83, and the four vibrating electrodes 86A are independently disposed on the upper surface of the stylus support 83 opposing the upper surface of the stylus support 83 with the base end of the stylus 84 correspondingly to the detecting electrodes 87A.

Figure 10:
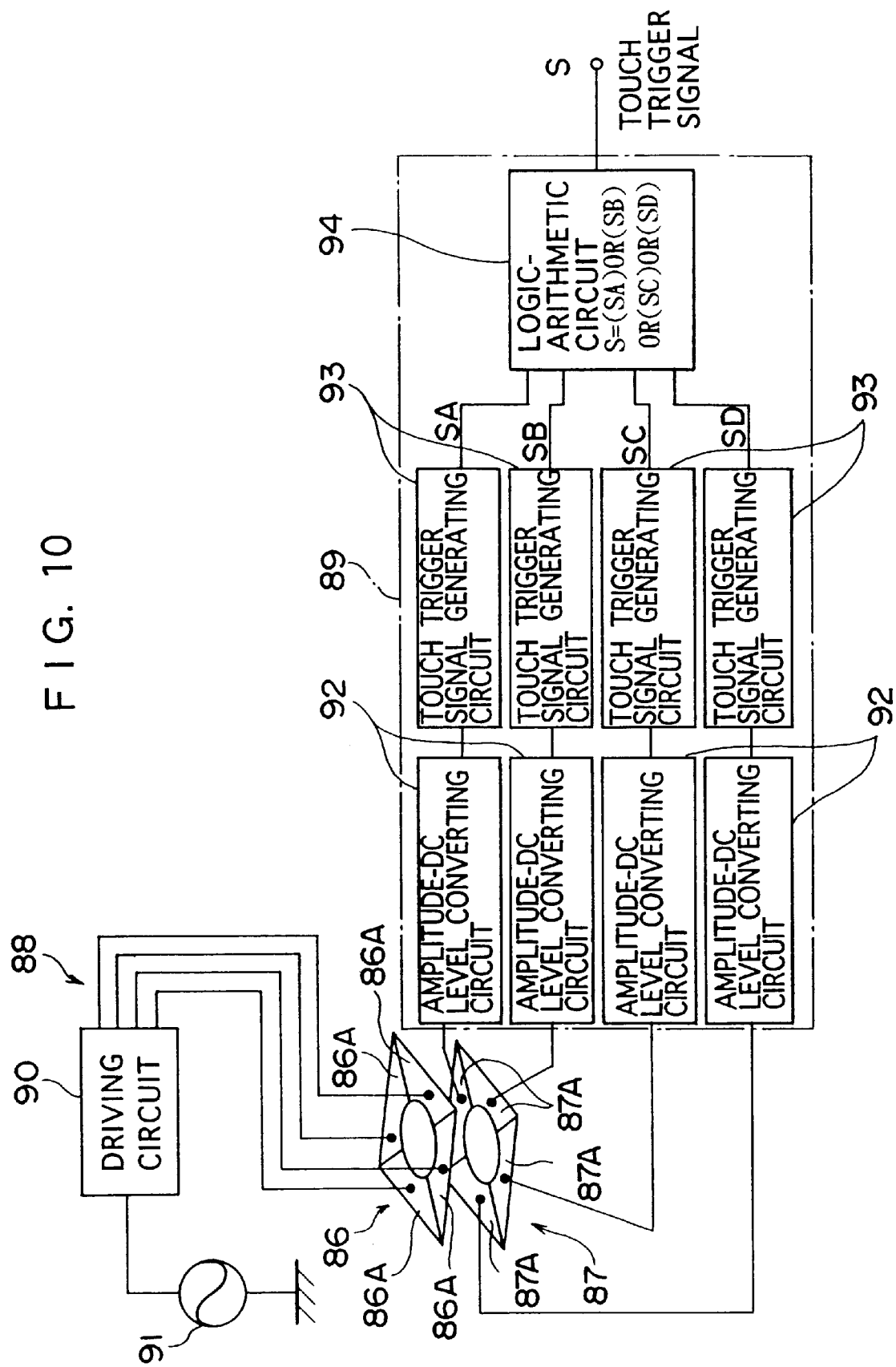
FIG. 10 is a block diagram showing a structure of a vibrating means and control means.

Specific arrangement of the vibrating circuit 88 and the control means 89 is shown in FIG. 10.

In FIG. 10, the vibrating circuit 88 vibrates the stylus 84 at a frequency substantially equivalent to the intrinsic frequency of the vibrator 85 and includes a driving circuit 90 for applying vibrating current to the four vibrating electrode 86A of the vibrating piezoelectric element 86, and a power supply 91 for driving the driving circuit 90.

The control means 89 generates a touch trigger signal S independently using a plurality of detection signal respectively obtained by the four detecting electrodes 87A without combining with each other. The control means 89 includes four amplitude-DC-level converting circuits 92 for respectively converting amplitude respectively detected by the four detection electrodes 87A into DC level, four touch trigger signal generating circuits 93 for generating touch trigger signals SA, SB, SC and SD by the signal outputted by the amplitude-DC-level converting circuit 92, and logic-arithmetic circuit 94 for selecting the first-arrived signal from the respective touch trigger signals SA, SB, SC and SD generated by all of the processing system of the touch trigger signal generating circuit 93 to obtain an overall touch trigger signal S.

The logic arithmetic circuit 94 selects a signal having the shortest time before reaching detection trigger level from the contact portion's initiation of touching the workpiece out of the touch trigger signals SA, SB, SC and SD sent from the touch trigger signal generating circuit 93, thereby transmitting a final touch trigger signal S.

Figure 11:
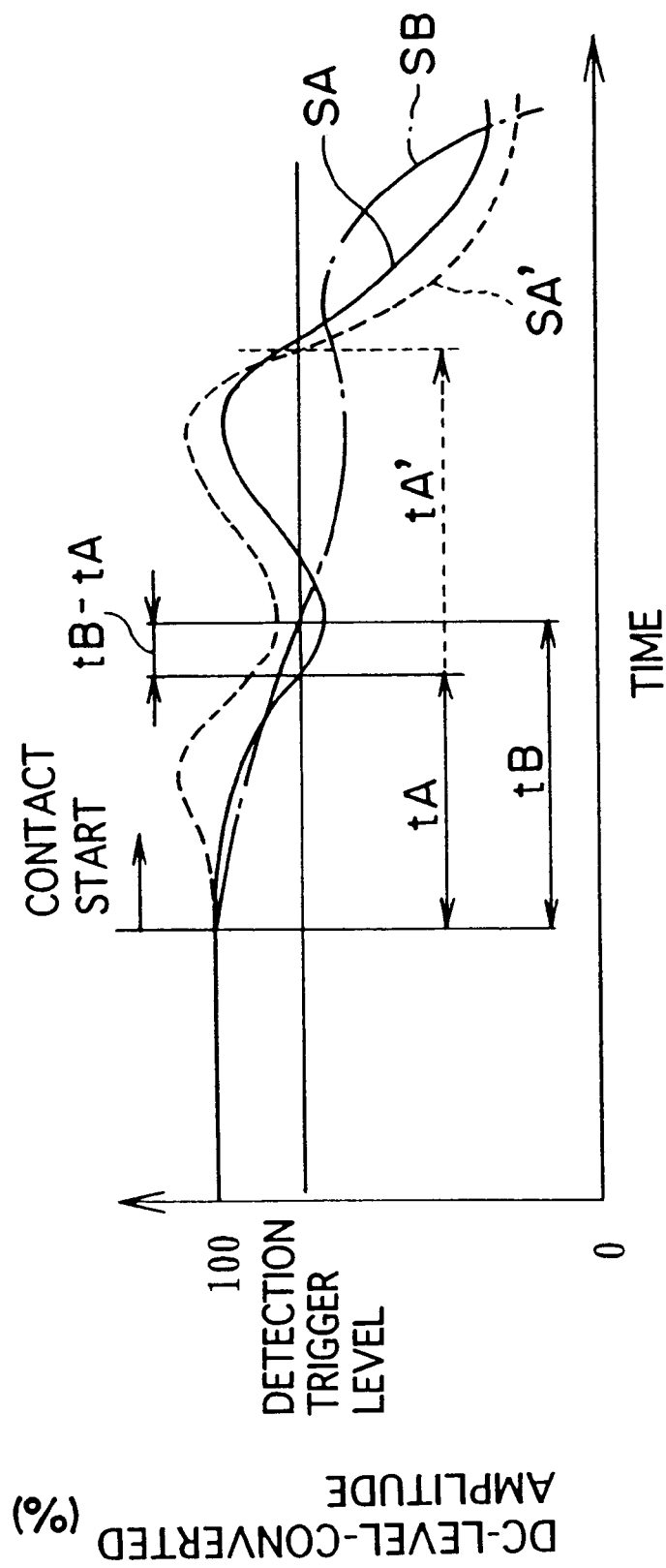
FIG. 11 is a graph showing a relationship between time and DC-level-converted amplitude in the third embodiment.

In other words, as shown in FIG. 11, when the signal SA has the shortest detection time within respective touch trigger signals SA, SB, SC and SD in a repeated measurement, it takes tA for the detection signal SA to reach the detection trigger level from initiation of touch. If the behavior of the waveform of the detection signal SA changes into signal SA', it takes longer tA' time than tA to reach the detection trigger level from initiation of touch. On the other hand, when the signal SB has the second shortest detection time within respective touch trigger signals SA, SB, SC and SD, it takes tB (tA<tB<tA) for the signal SB to reach the detection trigger level from initiation of touch, thereby delaying by only (tB−tA) as compared to tA having the shortest detection time. Accordingly, even when the behavior of the waveform is changed to delay timing to reach the detection trigger level, the overall trigger signal S is transmitted based on the detection signal of the second fastest, or, the third fastest system.

According to the above-described third embodiment, following effects can be obtained.

(7) Since the touch signal probe has the stylus support 83, the vibrator 85 radially projecting from the stylus support 83 and including the four styluses 84 having the contact portion 84B at the pointed end thereof, a vibrating means 86A disposed to the stylus support 83 and vibrating the stylus 84 at a frequency substantially consistent with the intrinsic frequency of the vibrator 85, the detecting means 87A disposed to the stylus support 83 and detecting the condition of vibration changing in accordance with the touch of the contact portion 84B with the workpiece, and the control means 89 for arithmetically processing the detection signal detected by the detecting means 87A to transmit the touch trigger signal, the four detecting means 87A being disposed to the stylus support 83 to correspond to the four styluses 84, the vibration and the detection can be simultaneously conducted in all of the longitudinal directions of the stylus 84 (the X-axis direction and the Y-axis direction). Accordingly, the measurement can be conducted at the same condition whichever contact portion 84B of the four styluses 84 touches the workpiece, thereby canceling dispersion of detection power for every stylus 84.

(8) Since the control means 89 separately uses a plurality of detection signal respectively obtained by the four detecting means 87A without combining with each other, the vibration condition change in accordance with the contact of the contact portion 84B to the workpiece can be detected without depending on styluses of the styluses 84 not touching the workpiece and direction in which the contact portion 84B touches the workpiece. Accordingly, the detection signal detected by respective detecting means 87A can be processed separately preventing the detection signal from the detecting means 87A being influencing with each other, thereby detecting the sharply-changing signal without blunting to reduce detection delay.

(9) The control means 89 generates separate touch trigger signal SA, SB, SC and SD for respective processing system by signal-processing the four detection signals independently obtained by the four detecting means 87A, and selects the first-arrived signal of the separate touch trigger signal SA, SB, SC and SD to make the overall touch trigger signal, so that the detection delay from the initiation of the touch of the contact portion to the workpiece to the transmission of the overall touch trigger signal does not depend on the styluses not touching the workpiece and the direction in which the contact portion touches the workpiece. And since the fastest transmitted touch trigger signal SB is selected as the final touch trigger S out of the plurality of the touch trigger signals SA, SB, SC and SD transmitted by independently signal-processed by the respective signal system, the detection delay of the sensor can be minimized even when the detection signal changes in repeated measurement with regard to respective system, thereby reducing detection delay.

(10) Since the four detecting means 87A are independently disposed on the lower side of the block-shaped stylus support 83 and the four vibrating means 86A are disposed to the upper surface of the stylus support 83 opposing and corresponding to the detecting means 87A with the stylus 84 positioned therebetween, the detecting means 87A and the vibrating means 86A are opposingly disposed with the base end of the stylus 84 positioned therebetween. Accordingly, the detecting means 87A and the vibrating means 86A can be closely disposed on both sides of the base end of the stylus 84, thereby vibrating the stylus 84 by the vibrating means 86A adjacently to the stylus 84 and detecting the change in the vibration condition by the detecting means 87A.

(11) Since the detecting means 87A is formed by dividing the single detecting piezoelectric element 87 into four sections, the detecting means 87A can be attached to the stylus support 83 by, for instance, adhering the single piezoelectric element 87, thereby facilitating the attachment of the detecting means 87A. Similarly, since the vibrating means 86A is formed by dividing the single vibrating piezoelectric element 86 into four sections, the vibrating means 86A can be attached to the stylus support 83 by, for instance, adhering the single piezoelectric element 86, thereby simplifying the attachment of the vibrating means 86A.

(12) Since the stylus support 83 is formed in a rectangular solid having a square plane orthogonal to the Z-axis, the center position of the stylus support 83 can be easily adjusted to the origin of the X, Y and Z-axis, thereby facilitating assembly of the touch signal probe.

(13) Since the stylus 84 includes the first pair of styluses fixed along the X-axis and symmetrically disposed with the origin positioned therebetween and the second pair of styluses fixed along the Y-axis and symmetrically disposed with the origin positioned therebetween, crosswise configuration of the touch signal can be made possible in which the stylus 84 extending in the X-axis direction and the Y-axis direction from the four sides of the stylus support 83.

Incidentally, following modification of the third embodiment is also included within the scope of the present invention.

For example, the vibrating means 86A is formed by dividing the single piezoelectric element 86 into four sections in the above-described third embodiment. However, the respective vibrating means can be formed of one piezoelectric element, or, alternatively, other actuator may be used instead of the piezoelectric element.

Similarly, though the detecting means 87A is formed by dividing the single piezoelectric element 87 into four sections, the four detecting means may be formed of one piezoelectric element respectively, or, alternatively, other actuator may be used instead of the piezoelectric element.

Furthermore, though the four styluses 84 are provided along the X-axis and Y-axis, respectively one stylus may be provided along the X-axis and the Y-axis, or alternatively, along the Z-axis. When the one stylus 84 is provided along the X-axis and the Y-axis respectively, a balancer is preferably provided to a side having no stylus 84 to balance the stylus 84 with respect to vibration.

The stylus support 83 and the piezoelectric element 86 and 87 may have circular plane configuration.

Further, though the vibration is simply applied at a frequency approximately consistent with the intrinsic frequency of the vibrator 85 in the aforesaid embodiment, the first intrinsic vibration and the second intrinsic vibration may be combined to apply vibration in the third embodiment in the same manner as in the first embodiment and the second embodiment, thereby additionally obtaining respective effects mentioned in the first embodiment and the second embodiment.

What is claimed is:

1. A touch signal probe, comprising:
    a stylus support having a center defining an origin of mutually orthogonal X- and Y-axes;
    a vibrator attached to the stylus support and having at least one stylus extending along at least one of the X-axis and Y-axis; and
    a vibration generator/detector formed on the stylus support for vibrating the vibrator at a predetermined frequency and for detecting a change in the vibration of the vibrator caused when the stylus contacts a workpiece,
    wherein the predetermined frequency is one of a primary intrinsic frequency $\omega 1$ and a secondary intrinsic frequency $\omega 2$ ($\omega 2 \neq \omega 1$) of the vibrator, whereby the change in the vibration of the vibrator is amplified by occurrence and superposition of a vibration component of the other of the primary intrinsic frequency $\omega 1$ and the secondary intrinsic frequency $\omega 2$ to the vibration of the vibrator when the stylus contacts the workpiece.

2. The touch signal probe according to claim 1, further comprising a beat signal component sampling element for detecting a beat signal generated by said superposition.

3. The touch signal probe according to claim 1, wherein the at least one stylus includes a first pair of styluses extending along the X-axis and symmetrically disposed with respect to the origin and a second pair of styluses extending along the Y-axis and symmetrically disposed with respect to the origin.

4. The touch signal probe according to claim 1, wherein the at least one stylus includes a stylus member and a balance member provided on opposite sides of the stylus support along said at least one of the X-axis and Y-axis, the balance member being configured to be dynamically equivalent to the stylus member.

5. A touch signal probe, comprising:
    a stylus support;
    a vibrator including a plurality of styluses each projecting from the stylus support and having a contact portion at a distal end thereof for contacting a workpiece;
    a vibration generator disposed on the stylus support for vibrating the vibrator at a predetermined frequency approximately coincident with an intrinsic frequency of the vibrator;
    a plurality of vibration detectors each disposed on the stylus support corresponding to one of the plurality of styluses for generating a contact detection signal upon detecting a change in the vibration of the vibrator caused when the contact portion or portions of at least one of the plurality of styluses touches the workpiece; and a control element for arithmetically processing the contact detection signals generated by the vibration detectors to generate a contact trigger signal, wherein the control element separately processes, without combining, the contact detection signals so that the detection of the change in the vibration of the vibrator is not affected by the contact detection signal or signals generated by the stylus or styluses not touching the workpiece and a direction in which the contact portion or portions touches the workpiece.

6. A touch signal probe, comprising:

a stylus support;

a vibrator including a plurality of styluses each projecting from the stylus support and having a contact portion at a distal end thereof for contacting a workpiece;

a vibration generator disposed on the stylus support for vibrating the vibrator at a frequency approximately coincident with an intrinsic frequency of the vibrator;

a plurality of vibration detectors each disposed on the stylus support corresponding to one of the plurality of styluses for generating a contact detection signal upon detecting a change in the vibration of the vibrator caused when the contact portion or portions of at least one of the plurality of styluses touches the workpiece; and a control element for arithmetically processing the contact detection signals generated by the vibration detectors to generate a contact trigger signal;

wherein the control element separately processes, without combining, the contact detection signals; and wherein the control element generates for each of the contact detection signals an intermediate contact signal, and selects one of the intermediate contact signals which first satisfies a predetermined condition as the contact trigger signal, whereby the detection of the change in the vibration of the vibrator is not affected by the contact detection signal or signals generated by the stylus or styluses not touching the workpiece and a direction in which the contact portion or portions touches the workpiece.

7. The touch signal probe according to claim 5, wherein the plurality of vibration detectors and the vibration generator are disposed on opposite sides of the stylus support, and the plurality of styluses project from regions of the stylus support between the opposite sides.

8. The touch signal probe according to claim 5, wherein said predetermined frequency is one of a primary intrinsic frequency ω1 and a secondary intrinsic frequency ω2 (ω2≠ω1) of the vibrator, whereby the change in the vibration of the vibrator is amplified by superposition of a vibration component of the other of the primary intrinsic frequency ω1 and the secondary intrinsic frequency ω2 to the vibration of the vibrator when the vibrator contacts the workpiece.

9. A touch signal probe, comprising:

a vibrator including a stylus support and at least one stylus projecting from the stylus support along one of a X-axis and a Y-axis, said vibrator having a first intrinsic frequency associated with a first resonance mode in which a maximum and a minimum of vibrations of the vibrator in the X-axis are substantially temporally coincident with a maximum and a minimum of vibrations of the vibrator in the Y-axis, respectively, and a second intrinsic frequency associated with a second resonance mode in which the maximum and minimum of the vibrations of the vibrator in the X-axis are substantially coincident with the minimum and maximum of the vibrations of the vibrator in the Y-axis, respectively;

a vibration generator formed on the stylus support for vibrating the vibrator at one of the first and second intrinsic frequencies; and a vibration detector for detecting a change in the vibration of the vibrator caused when the stylus contacts a workpiece.

10. The touch signal probe of claim 9, further comprising a beat signal component sampling element tuned to detect a beat signal generated when the stylus contacts the workpiece, said beat signal being of a frequency which is substantially equal to a difference between the first and second intrinsic frequencies.

11. The touch signal probe of claim 9, wherein the vibrator is configured to have a first vibration amplitude associated with the first resonance mode substantially equal to a second vibration amplitude associated with the second resonance mode.

12. The touch signal probe of claim 9, further comprising a detecting circuit coupled to the vibration detector for receiving a detection signal indicative of a status of the vibration of the vibrator; and a vibrating circuit coupled to the vibration generator for supplying a driving signal thereto to vibrate the vibrator, said vibrating circuit including:

an intrinsic frequency sampling circuit coupled to said detecting circuit for receiving the detection signal and extracting said one of the first and second intrinsic frequencies therefrom; and and a driving circuit coupled to said intrinsic frequency sampling circuit and generating the driving signal based on the extracted one of the first and second intrinsic frequencies.

13. The touch signal probe of claim 9, wherein the at least one stylus includes a first pair of symmetrical styluses extending in opposite directions along said one of the X-axis and the Y-axis.

14. The touch signal probe of claim 13, wherein the at least one stylus further includes a second pair of symmetrical styluses extending in opposite directions along the other of the X-axis and the Y-axis.

15. The touch signal probe of claim 9, wherein the at least one stylus includes a stylus member and a balance member provided on opposite sides of the stylus support along said one of the X-axis and Y-axis, the balance member being configured to be dynamically equivalent to the stylus member and projecting from the stylus support for a length substantially shorter than that of the stylus member.

16. The touch signal probe of claim 15, wherein the at least one stylus further includes another pair of balance members provided on opposite sides of the stylus support along the other of the X-axis and Y-axis, the another pair of balance members being configured to be dynamically equivalent to each other and projecting from the stylus support for a length substantially shorter than that of the stylus member.

17. The touch signal probe of claim 9, wherein the vibration detector and generator are disposed on opposite sides of the stylus support, and the at least one stylus project from a region of the stylus support positioned between said opposite sides.

18. The touch signal probe of claim 9, wherein the at least one stylus includes a plurality of styluses and the vibration detector comprises a plurality of detecting electrodes each positioned corresponding one of the plurality of styluses for detecting a change in the vibration of thereof, said detecting electrodes are not electrically commonly connected.

19. A method of sensing a workpiece, comprising the steps of:

providing a vibrator including a stylus support and at least one stylus projecting from the stylus support along one of a X-axis and a Y-axis, said vibrator having a first intrinsic frequency associated with a first resonance mode in which a maximum and a minimum of vibrations of the vibrator in the X-axis are substantially temporally coincident with a maximum and a minimum of vibrations of the vibrator in the Y-axis, respectively, and a second intrinsic frequency associated with a second resonance mode in which the maximum and minimum of the vibrations of the vibrator in the X-axis are substantially coincident with the minimum and maximum of the vibrations of the vibrator in the Y-axis, respectively;

vibrating the vibrator at one of the first and second intrinsic frequencies; and detecting a change in the vibration of the vibrator caused when the stylus contacts the workpiece.

* * * * *